(12) United States Patent
O'Krafka et al.

(10) Patent No.: US 8,396,937 B1
(45) Date of Patent: Mar. 12, 2013

(54) EFFICIENT HARDWARE SCHEME TO SUPPORT CROSS-CLUSTER TRANSACTIONAL MEMORY

(75) Inventors: Brian W. O'Krafka, Austin, TX (US); Darpan Dinker, Union City, CA (US); Michael J. Koster, Bridgeville, CA (US)

(73) Assignee: Oracle America, Inc., Redwood City, CA (US)

( * ) Notice: Subject to any disclaimer, the term of this patent is extended or adjusted under 35 U.S.C. 154(b) by 608 days.

(21) Appl. No.: 11/742,106

(22) Filed: Apr. 30, 2007

(51) Int. Cl.
*G06F 15/167* (2006.01)
*G06F 13/00* (2006.01)
*G06F 13/28* (2006.01)

(52) U.S. Cl. ........ 709/214; 709/213; 711/141; 711/143; 711/146; 711/162

(58) Field of Classification Search .......... 709/213, 709/214; 711/141, 143, 146, 162; 714/5; 707/640–660
See application file for complete search history.

(56) References Cited

U.S. PATENT DOCUMENTS

| | | | | |
|---|---|---|---|---|
| 5,208,913 A * | 5/1993 | Yamamoto | ...................... | 710/60 |
| 5,428,766 A * | 6/1995 | Seaman | ........................ | 709/215 |
| 5,737,568 A * | 4/1998 | Hamaguchi et al. | .......... | 711/121 |
| 5,745,672 A * | 4/1998 | Stiffler | .............................. | 714/6 |
| 6,026,504 A * | 2/2000 | Hagiwara | ...................... | 714/47 |
| 6,360,231 B1 * | 3/2002 | Pong et al. | ..................... | 707/201 |
| 6,466,825 B1 * | 10/2002 | Wang et al. | ........................ | 700/5 |
| 6,487,645 B1 * | 11/2002 | Clark et al. | .................... | 711/162 |
| 6,530,003 B2 * | 3/2003 | Bakke et al. | .................. | 711/162 |
| 6,536,000 B1 * | 3/2003 | Jackson et al. | .................. | 714/57 |
| 6,553,509 B1 * | 4/2003 | Hanson et al. | .................... | 714/5 |
| 6,934,755 B1 * | 8/2005 | Saulpaugh et al. | ........... | 709/226 |
| 7,039,661 B1 * | 5/2006 | Ranade | ................................. | 1/1 |
| 7,111,189 B1 * | 9/2006 | Sicola et al. | ...................... | 714/6 |
| 7,577,867 B2 * | 8/2009 | Lewin et al. | ...................... | 714/6 |
| 7,613,743 B1 * | 11/2009 | Giampaolo et al. | .................. | 1/1 |
| 7,676,691 B2 * | 3/2010 | Fachan et al. | .................... | 714/15 |
| 7,689,607 B2 * | 3/2010 | Oks et al. | ...................... | 707/648 |
| 7,752,402 B2 * | 7/2010 | Fachan et al. | ................. | 711/161 |
| 2002/0073283 A1 * | 6/2002 | Lewis et al. | ................... | 711/133 |
| 2002/0087807 A1 * | 7/2002 | Gharachorloo et al. | ...... | 711/141 |
| 2005/0132250 A1 * | 6/2005 | Hansen et al. | .................... | 714/5 |
| 2006/0075057 A1 * | 4/2006 | Gildea et al. | .................. | 709/212 |

(Continued)

OTHER PUBLICATIONS

McDonald, A. , et al.; "Characterization of TCC on Chip-Multiprocessors"; Comput. Syst. Lab., Stanford Univ., CA, USA; This paper appears in: Parallel Architectures and Compilation Techniques, 2005. PACT 2005. 14th International Conference on Publication Date: Sep. 17-21, 2005; On pp. 63-74. Current Version Published: Oct. 10, 2005.

(Continued)

*Primary Examiner* — Catherine Thiaw
(74) *Attorney, Agent, or Firm* — Rory D. Rankin; Meyertons, Hood, Kivlin, Kowert & Goetzel, P.C.

(57) ABSTRACT

A method and system for increasing programmability and scalability of a multi-processor network. A system includes two or more nodes coupled via a network with each node comprising a processor unit and memory. The processor unit includes one or more processors and a wiretap unit. The wiretap unit is configured to monitor memory accesses of the processors. A transaction may execute a number of read and/or write operations to memory. The nodes are configured to replicate one or more portions of memory; detect data conflicts to memory; and restore memory to pre-transaction state if needed.

18 Claims, 15 Drawing Sheets

U.S. PATENT DOCUMENTS

| | | | | |
|---|---|---|---|---|
| 2006/0212754 | A1* | 9/2006 | Yamaguchi et al. | 714/20 |
| 2007/0214333 | A1* | 9/2007 | Nijhawan et al. | 711/165 |
| 2007/0260608 | A1* | 11/2007 | Hertzberg et al. | 707/10 |
| 2008/0126365 | A1* | 5/2008 | Fachan et al. | 707/100 |
| 2008/0256073 | A1* | 10/2008 | Detlefs et al. | 707/8 |
| 2008/0270745 | A1* | 10/2008 | Saha et al. | 712/1 |

OTHER PUBLICATIONS

Carlstrom, B.D., et al.; "The ATOMOS Transactional Programming Language"; ACM SIGPLAN Notices archive vol. 41, Issue 6 (Jun. 2006) Proceedings of the 2006 PLDI Conference; pp. 1-13; 2006.

Carlstrom, B.D., et al.; "Transactional Execution of Java Programs"; Comput. Syst. Lab., Stanford Univ., CA, USA; Publication: Oct. 7, 2005; 12 pgs.

McDonald, A., et al.; "Architectural Semantics for Practical Transactional Memory"; ACM SIGARCH Computer Architecture News archive; vol. 34, Issue 2 (May 2006) pp. 53-65; 2006.

Hammond, L., et al.; "Transactional Memory Coherence and Consistency"; ACM SIGARCH Computer Architecture News archive; vol. 32, Issue 2 (Mar. 2004) p. 102; 2004.

Chung, J.W., et al.; "The Common Case Transactional Behavior of Multithreaded Programs"; Comput. Syst. Lab., Stanford Univ., CA, USA; This paper appears in: High-Performance Computer Architecture, 2006. The Twelfth International Symposium on Publication Date: Feb. 11-15, 2006; on pp. 266-277. Current Version Published: Feb. 27, 2006.

Hammond, L., et al.; "Programming with Transactional Coherence and Consistency (TCC)"; Comput. Syst. Lab., Stanford Univ., CA, USA; ASPLOS'04, Oct. 7-13, 2004, Boston, Massachusetts, USA; 2004 ACM.

Hammond, L., et al.; "Transactional Coherence and Consistency: Simplifying Parallel Hardware and Software"; Published by the IEEE Computer Society; Nov.-Dec. 2004; pp. 92-103.

Chafi, H., et al.; "TAPE: A Transactional Application Profiling Environment"; International Conference on Supercomputing archive, Proceedings of the 19th annual international conference on Supercomputing; Cambridge, Massachusetts; pp. 199-208; Jun. 20-22, 2005.

Carlstrom, B.D., et al.; "The Software Stack for Transactional Memory Challenges and Opportunities"; STMCS'06; Mar. 26, 2006, Manhattan, New York, NY.

* cited by examiner

EFFICIENT HARDWARE SCHEME TO SUPPORT CROSS-CLUSTER TRANSACTIONAL MEMORY

BACKGROUND OF THE INVENTION

1. Field of the Invention

This invention relates to high performance computing network systems, and more particularly, to maintaining a global transactional memory across a cluster of multi-processor nodes.

2. Description of the Relevant Art

High performance computing is often obtained by using high-end servers. In other cases, clusters of multi-processor nodes may be coupled via a network to provide high performance computing. In some cases, a cluster of nodes may have a lower financial cost of a high-end server. However, the cluster of multi-processor nodes may lack the programmability of high-end server systems. Additionally, such clusters may not include a global, cache coherent shared address space. One method to increase the programmability of a cluster of multi-processor nodes is to implement a transactional memory across the cluster.

Generally speaking, a transaction may comprise a sequence of operations that perform read and/or write operations to memory. These read and write operations may logically occur at a single instant in time. Accordingly, the whole sequence of instructions may occur in an atomic manner, such that intermediate states are not visible to other transactions. Also, while a cluster of multi-processor nodes may not have shared memory, it may be desired to have a technique for making the non-shared memory behave like shared memory with a global, shared address space. One method of implementing transactional memory across a cluster of multi-processor nodes is by use of software techniques. However, software techniques involve significant overhead and thus, incorporate a performance penalty and scalability limits.

In view of the above, methods and mechanisms for managing clusters of processing nodes are desired.

SUMMARY OF THE INVENTION

Systems and methods with hardware for achieving ease of programmability and scalability in clusters of processing nodes are disclosed. In one embodiment, multiple processing nodes are coupled via a network. The nodes may include one or more processors and memory. In addition, each node may comprise a "wiretap" unit (WT Unit) configured to support transactional coherence. The WT Unit and the memory included in the node are coupled to the processor(s). In one embodiment, the WT Unit is configured to monitor memory accesses of the processors and to participate in the cache coherence protocol within each node. In one embodiment, the WT Unit and a network ensure the result of multiple transactions (or sequence of instructions from a larger piece of software code), executing in parallel is the same as if the multiple transactions were executed in a global serial manner. Therefore, a transaction may be committed to architectural state if there are no data conflicts with other transactions.

In one embodiment, as the WT Unit monitors all memory accesses within its node, it may be used to detect data conflicts. A data conflict occurs when a first transaction reads data from a line in memory and a second transaction writes to the same memory line, and vice-versa. Also the WT Unit may be configured to ensure processor caches are flushed, or dirty lines are written-back to memory, at the beginning and the end of each transaction.

Figure 1A:
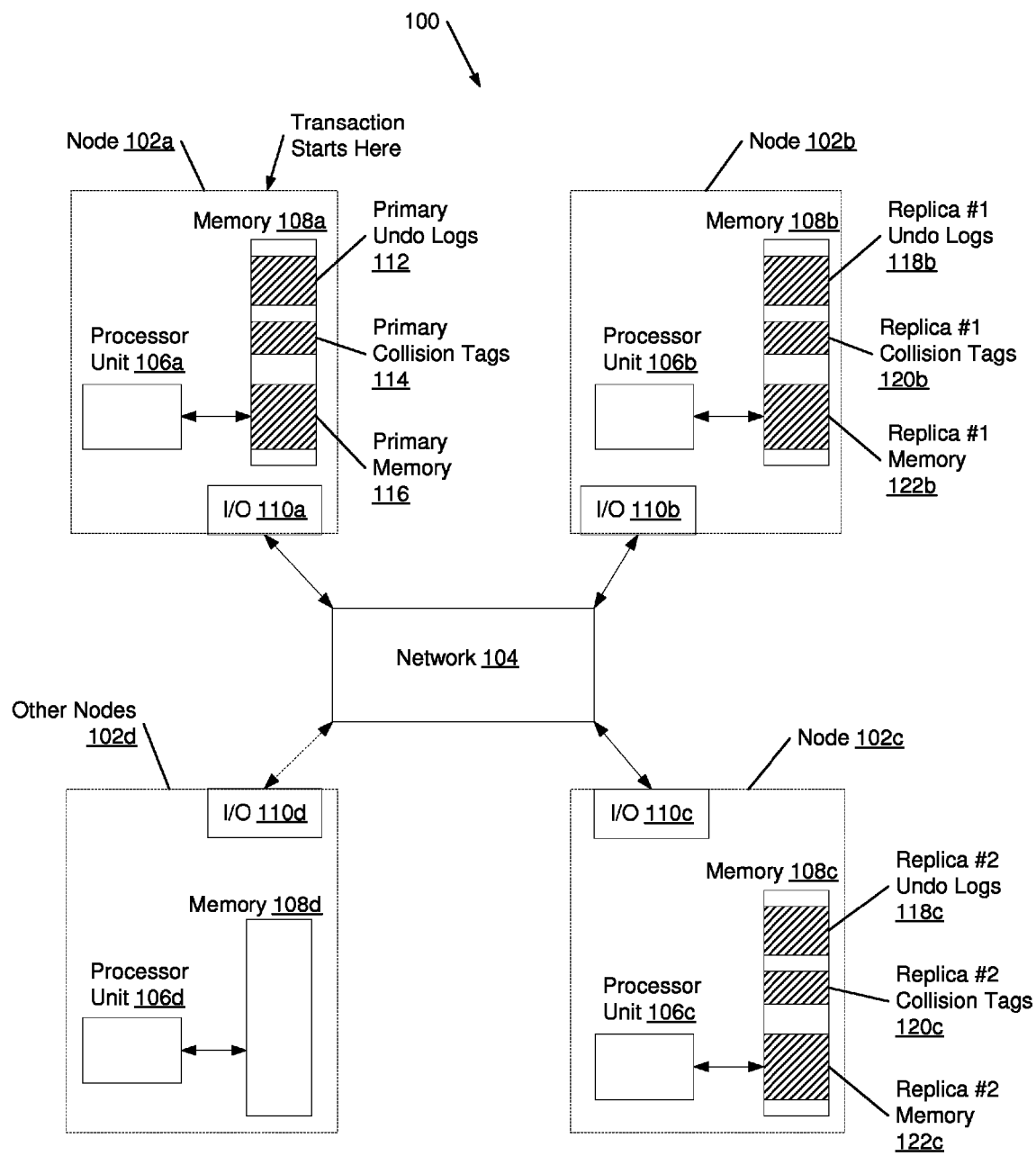
FIG. 1A is a block diagram of a system containing a network and a cluster of nodes.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1A, one embodiment is shown of a system 100 that includes a cluster of processing nodes 102a-102d coupled to a network 104 through I/O interfaces 110a-110d. As used herein, elements referred to by a reference numeral followed by a letter may be collectively referred to by the numeral alone. For example, processing nodes 102a-102d may be collectively referred to as processing nodes 102. As shown, each of the nodes 102 includes a processing unit 106a-106d and a memory 108a-108d. Physical memory of system 100 includes memory 108. Processing units 106 may comprise one or more processing chips and/or one or more multi-core processing chips. Here, processor units 106 may comprise a single integrated circuit or multiple integrated circuits. While only four nodes 102a-102d are shown, other embodiments may comprise fewer or more nodes. In one embodiment of system 100, network 104 may include remote direct memory access (RDMA) hardware and/or software. I/O interfaces 110 may comprise infiniband, PCI-Express, gigabit Ethernet, or otherwise.

Before a description of the system operations or further descriptions of the inner components of the blocks in FIG. 1A are given, a brief explanation of terminology is provided. For purposes of discussion, as described above, a transaction may comprise a sequence of operations that perform read and/or write operations to memory. In one embodiment, transactions are atomic, meaning that all operations are successfully completed before a new memory state is saved. Otherwise, in the event of a failure a new memory state is not saved and the pre-transaction memory state is kept. Transactions may also be isolated, meaning a transaction may not modify the memory state of another transaction. Also, changes to the memory state by a first transaction are generally not seen by a second transaction until the said first transaction successfully completes. A transaction may begin on a chosen processor in a processor unit in a node, such as node 102a in FIG. 1A. The contents of a node where a transaction begins, such as node 102a, may include primary processor unit 106a, primary transactional memory 116, and primary regions of memory for undo logs 112 and collision tags 114.

One or more nodes may include a copy, for durability reasons, of primary memory 116. Nodes 102b-102c in FIG. 1A are examples of such nodes. Therefore, in this example, two copies of primary memory 116 are being maintained for durability reasons. Copies of primary memory 116 are stored in replica memories 122b-122c. Nodes 102b-102c have replica undo logs 118b-118c and replica collision tags 120b-120c, which differ from the primary version in node 102a due to the addresses stored are different and depend on the physical addresses of Memory 108b-108c versus Memory 108a. A more detailed description of the contents of replica undo logs 118b-118c and replica collision tags 120b-120c is given later.

In one embodiment, system 100 may have an operating system (O.S.) for each node. In other embodiments, system 100 may have one O.S. for the entire system. A transaction may execute on system 100 alone or in parallel with multiple other transactions. Prior to the execution of a transaction, a node may be chosen to have one of its processors execute the instructions of the transaction, such as a processor in processor unit 106a in node 102a. The cache(s) of the chosen processor in node 102a is flushed prior to any operations of the transaction being executed. The pre-transaction memory state is the state of primary memory 116, replica memory 122b and replica memory 122c prior to any operations of the transaction being executed.

Each transaction may be executed in an atomic manner where all of the operations within a transaction are successfully completed before a new transaction state is saved that over-writes the pre-transaction state. The new transaction state may be saved in both primary memory 116 and replica memories 122b-122c. If a an Abort request from the application occurs in the middle of the execution of a transaction, the pre-transaction state is restored in primary memory 116 with the use of primary undo logs 112 and the pre-transaction state is restored in replica memories 122b-122c with the use of replica undo logs 118b-118c. The transaction may later reattempt execution of the transaction on primary node 102a or one of the replica nodes 102b-102c depending on the O.S.

Undo logs stored in memories 112 and 118b-118c may be configured to include a list of tasks performed as transaction execution continues. In one embodiment, the undo logs may be updated after the chosen processor's dirty cache lines are written-back to primary memory 116. In one embodiment, during write-back, the processor may continue transaction execution without interruption while processor unit 106a first reads a location in primary memory 116 corresponding to the dirty cache line and then writes the primary memory location's address and current contents into primary undo log 112. Next, the contents of the dirty cache line are written to the primary memory location. Also, the dirty cache line may be sent to nodes 102b-102c where the replica undo logs 118b-118c and replica memories 122b-122c may be updated in a similar manner just described.

When a software failure occurs, such as a collision, which may be two different transactions performing a write access to the same memory location, in one embodiment, the application may later send an Abort request to primary node 102a. Afterwards, replica nodes 102b-102c may be notified of the abort and the undo logs 112 and 118b-118c may be used to restore memories 116 and 122b-122c to the pre-transaction state. The undo logs 112 and 118b-118c may contain addresses to entries of the corresponding memory and older contents of the entries. To restore the pre-transaction state of memories 116 and 122b-122c, the undo logs are traversed, by the processor units, in the reverse order that they were earlier filled, and the corresponding memory entries are updated. When the contents of the first-filled entry of the undo log is updated in the corresponding memory, the corresponding memory is restored to its pre-transaction state. The write-back of the dirty cache lines, the update of the undo logs, the detection of collisions and the traversing of the undo logs to restore the pre-transaction state are performed by processor units 106a-106c. However, the processors within the processor units are not performing the actions. A more detailed description of the operations and embodiments are provided later.

In one embodiment, collision tags 114 and 120b-120c may be configured to include a list of memory addresses and transaction IDs. The memory addresses may be physical addresses, global virtual addresses or other depending on the chosen embodiment. The memory address stored along with a transaction ID in collision tags 114 may be an address of the chosen processor's dirty cache line being written-back to primary memory 116. The memory address stored along with a transaction ID in collision tags 120b may be an address of an entry in memory 122b corresponding to the entry in memory 116 being updated by the processor's dirty cache line. Likewise, the memory address stored along with a transaction ID in collision tags 120c may be an address of an entry in memory 122c corresponding to the entry in memory 116 being updated by the processor's dirty cache line. Also, the actions described above for the update of the undo logs during a dirty cache line write-back occur in nodes 102a-102c.

Figure 1B:
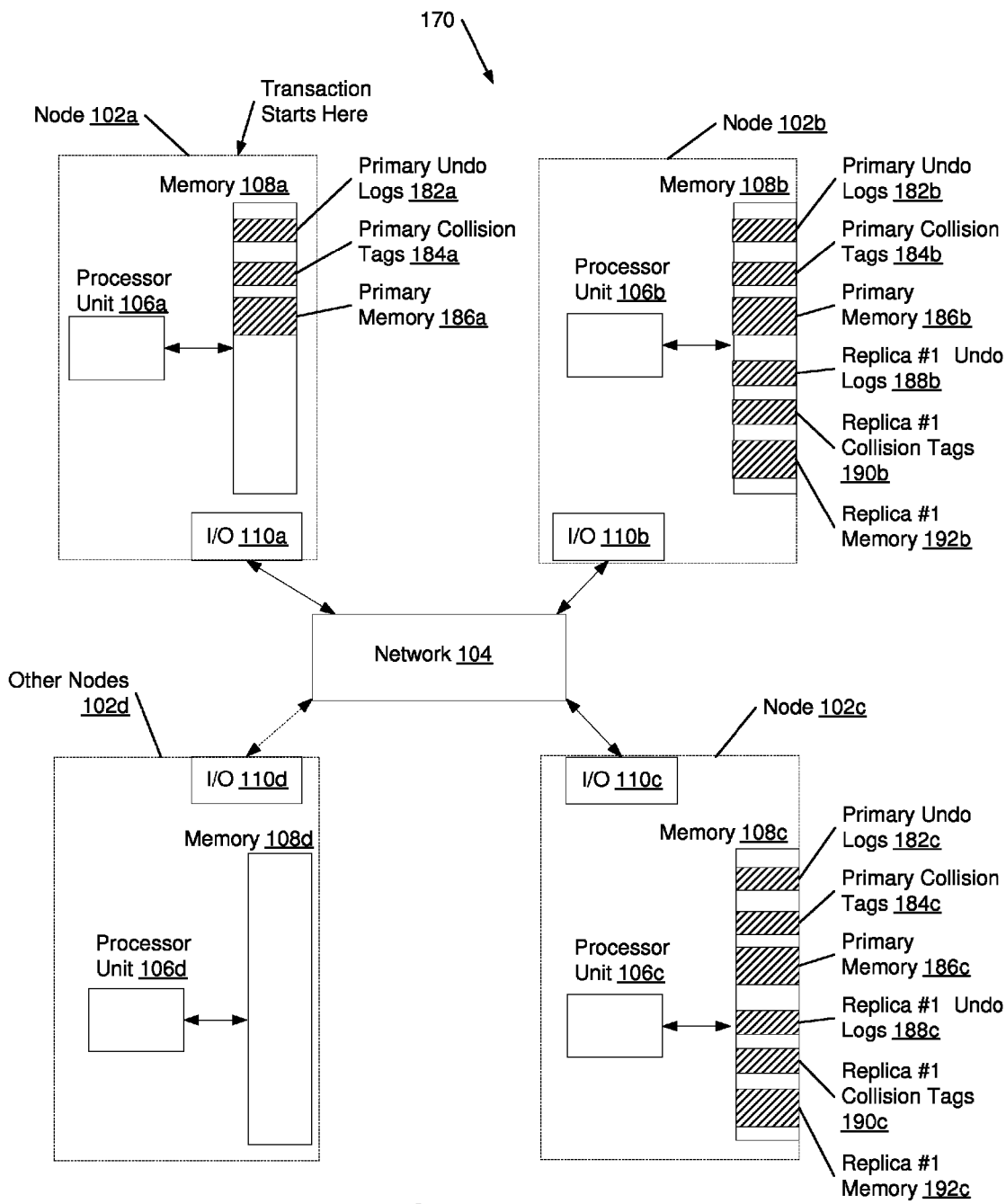
FIG. 1B is a block diagram of a system containing a network, a cluster of nodes and interleaved memory.

FIG. 1B illustrates one embodiment of a system 170 that includes a cluster of processing nodes 102a-102d coupled to a network 104 through I/O interfaces 110a-110d and interleaved regions of memory. A transaction may begin on a chosen processor in processor unit 106a. The primary regions of memory for undo logs, collision tags, and transactional memory may be interleaved across nodes in system 170 versus the primary regions of memory being located within one node, such as node 102a, as shown in system 100. For example, primary memories 186a-186c together may comprise the total transactional memory for a transaction being executed on the chosen processor within processor unit 106a. The contents of primary memories 186b-186c are not copies of the contents of primary memory 186a. Primary undo log 182a and collision tags 184a include, as part of their contents, addresses corresponding to primary memory 186a. Likewise, primary undo logs 182b-182c and collision tags 184b-184c include, as part of their contents, addresses corresponding to primary memories 186b-186c. Primary undo logs 182b-182c and collision tags 184b-184c are not copies of primary undo log 182a and collision tags 184a. In system 170 only one replica is shown versus two replicas in system 100, however, in other embodiments, more replicas may be included. As with primary regions of memory, replica regions of memory in system 170 may or may not be interleaved across multiple nodes.

Figure 1C:
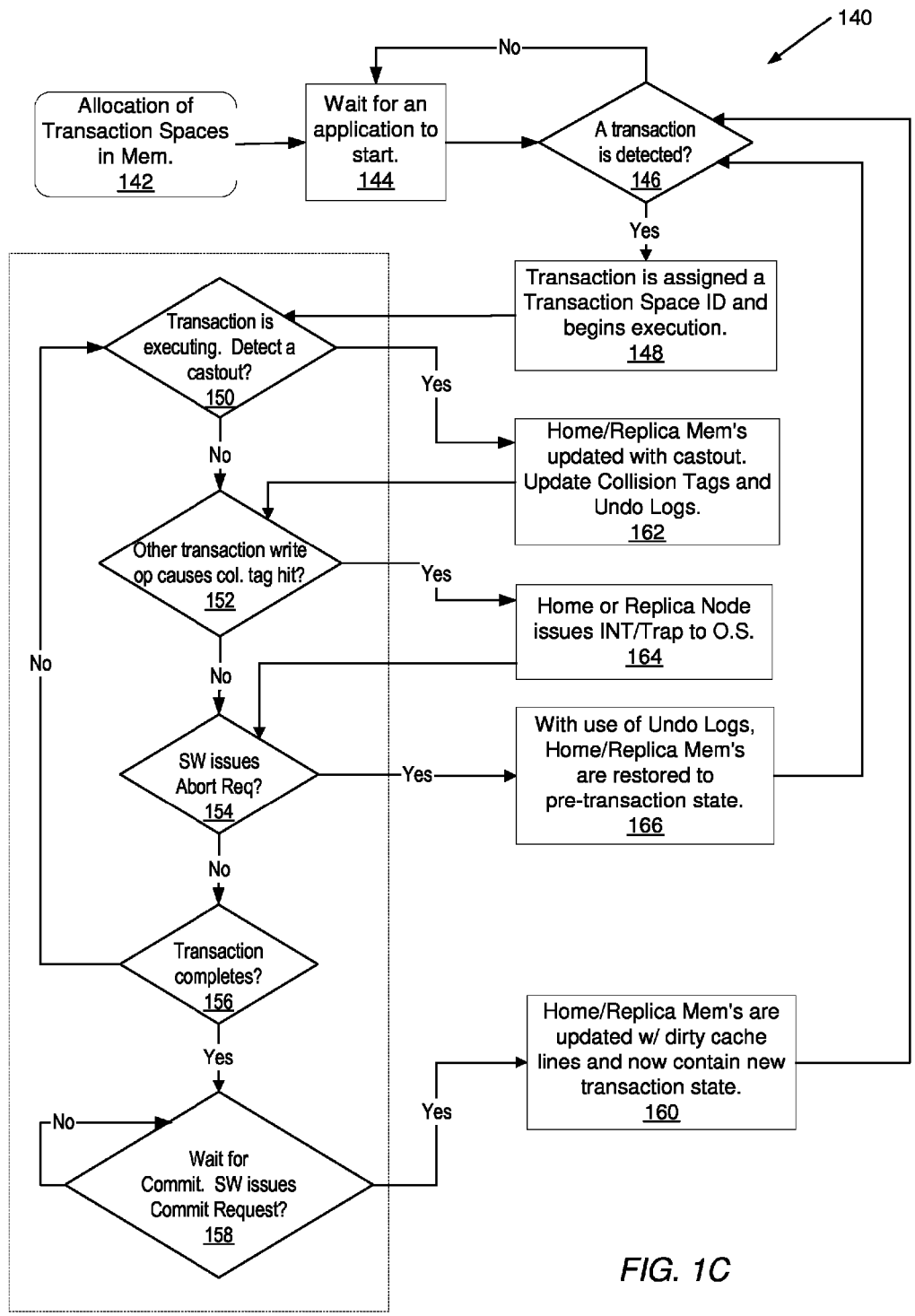
FIG. 1C is a flow diagram of one embodiment of a method for maintaining transactional memory on a cluster of nodes.

Turning now to FIG. 1C, one embodiment of a method 140 for executing one or more transactions on system 100 and/or 170 is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 142, one or more operating systems may allocate a number of regions of memory for Transaction Spaces. A transaction space may be configured to store both primary regions of memory and replica regions of memory (both used for undo logs, collision tags and physical memory) used for an execution of a transaction.

In block 144, system 100 and/or 170 wait for an application to begin or a new transaction within an already executing application to begin. If in decision block 146, a transaction is detected, whether it is a new transaction or an older transaction reattempting execution after a previous failure, software assigns a unique Transaction ID to that transaction as in block 148. For example, referring back to FIG. 1B, a transaction may need memory space that may include regions of memory such as regions 182, 184, 186, 188, 190 and 192. A processor within processor unit 106a may be assigned to perform the execution of the transaction.

At this point, referring again to FIG. 1C, the transaction enters the main branch of execution as denoted by the dashed block encompassing decision blocks 150-158. Beginning with decision block 150, as the operations of the transaction are executing, the processor within a processor unit 106a may need to write-back a dirty cache line to primary memory. This dirty cache line is referred to as a castout. If the processor unit 106a detects a castout, the castout is written-back to primary memory and it is written to the replica memories as well in block 162. Also, the primary and replica collision tags are updated with the address and transaction ID of this castout.

Multiple transactions may be executing simultaneously. Primary node 102a may have multiple transactions executing, but each transaction should have its own separate regions of memory. An error may occur in applications such as multiple transactions write to the same memory line. This event violates the isolation requirement of transactions. Each read and write access by a transaction of memory lines in primary memory causes the global address of the line to be stored in collision tags along with the corresponding transaction ID. The collision tags in both primary and replica nodes are updated. A comparison of global addresses and transaction IDs may be done for every write operation to memory in both primary and replica nodes. If the global addresses match, but the transaction IDs do not match, then a collision tag hit occurs. This hit represents that a second transaction is attempting to modify a line in memory being used by a first transaction.

In decision block 152, if a collision tag hit occurs in either the primary or replica node(s) as a transaction is executing, then the corresponding node sends an interrupt to the O.S. as in block 164. Later, the O.S. may issue an Abort request to stop execution of the transaction as in decision block 154. If this is the case, the primary node and replica node(s) have their memories returned to the pre-transaction state by the use of the undo logs in block 166. Otherwise, transaction execution continues until completion.

If in decision block 156 the transaction has completed, the primary node waits for the application to issue a Commit request in decision block 158. If the transaction has not completed, method 140 returns to decision block 150. Once the application does issue a Commit request, method 150 transitions to block 160 where the primary and replica memories are updated with castouts of lines stored in the primary processor unit. Upon completion of this operation, the primary and replica memories contain the new transaction state and method 140 returns to decision block 146.

Figure 2:
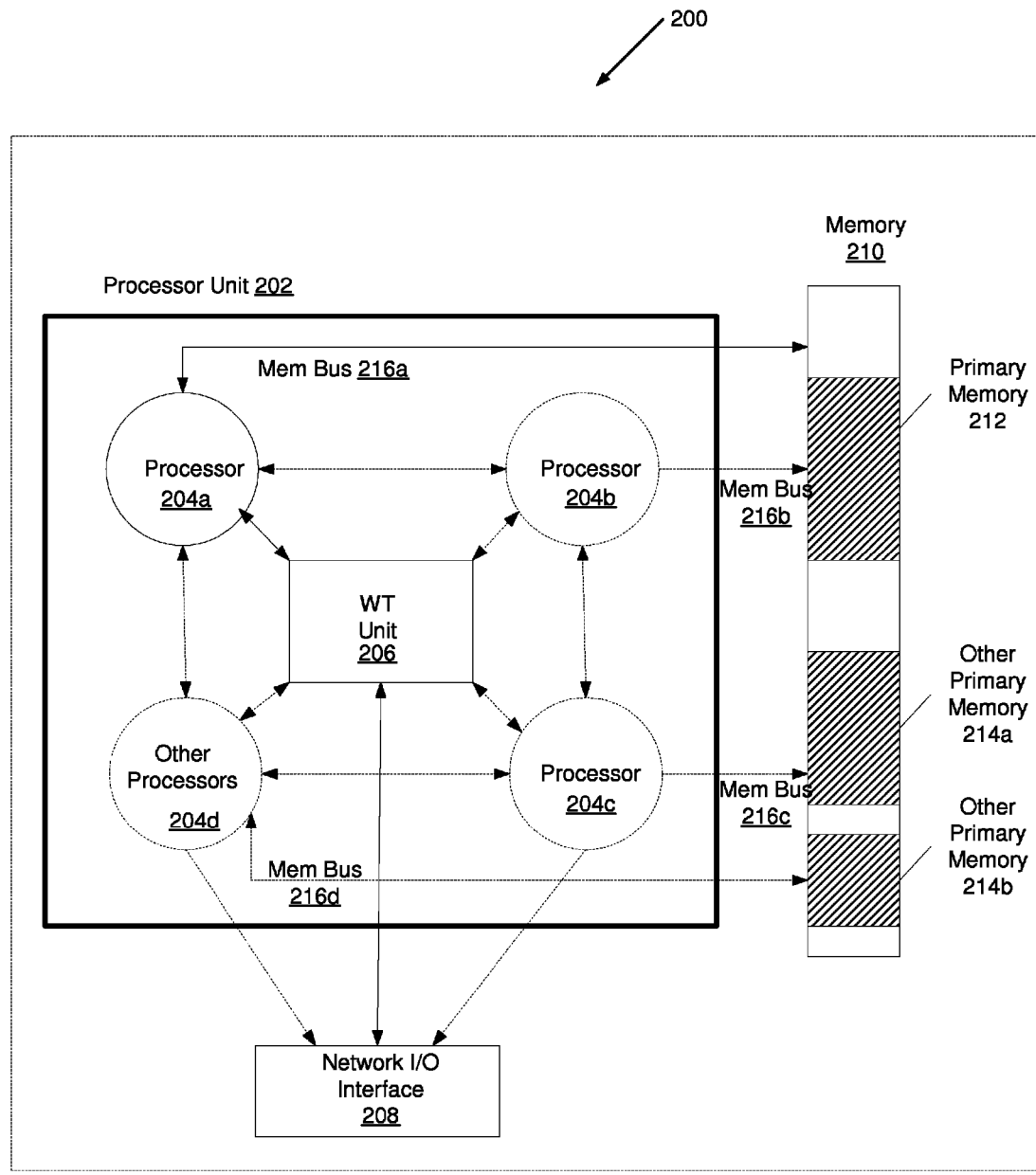
FIG. 2 is a block diagram illustrating one embodiment of a node comprising a processor unit and memory.

Turning now to FIG. 2, one embodiment of a node 200 is illustrated. Node 200 includes a processor unit 202 that comprises processors 204a-204d, memory 210, and an I/O interface 208. As shown, processors 204 are coupled to a wiretap unit (WT Unit) 206. In one embodiment, WT Unit 206 comprises application specific integrated circuitry. However, embodiments wherein WT Unit 206 comprises general-purpose circuitry are viable as well. Processors 204 and WT Unit 206 are coupled to I/O interface 208, which may incorporate RDMA related hardware and/or software. Also, processors 204 are coupled to memory 210 within the node. Each of the processors 204 may further be coupled to its own DRAM, which may be contained in memory 210 in the node. Memory 210 may be configured to include a region of memory for the execution of a transaction, such as Primary Memory 212. Also, memory 210 may include multiple regions of memory, such as Other Primary Memory 214a-214b, for use in the execution of other multiple transactions (possibly simultaneously). Likewise, memory 210 may contain multiple copies of undo logs and collision tags (not shown) with each copy corresponding to a separate transaction that may be running concurrently. Replica regions of memory for this transaction and other transactions may be included in memory 210.

In one embodiment, in order for each of the processors 204 to access memory, such as its respective DRAM, each of the processors 204 must go through, or otherwise involve, WT Unit 206. Therefore, for example, a write-back of a dirty cache line in any of the processors 204a-204d to memory 210 is seen by WT Unit 206. Because WT Unit 206 monitors or "taps" the interface between each of the processors 204a-204d and memory 210 in the node, it is referred to as a wiretap unit (WT Unit). In fact, as will be discussed below, WT Unit 206 may make a duplicate, or replica, of the cache line and, through network I/O interface 208, send correlating data to other nodes. WT Unit 206 may be further configured to access the DRAM of any of the processors 204. Additionally, WT Unit 206 may be configured to interface with other nodes, and thus, access the WT Unit of other nodes.

Figure 3:
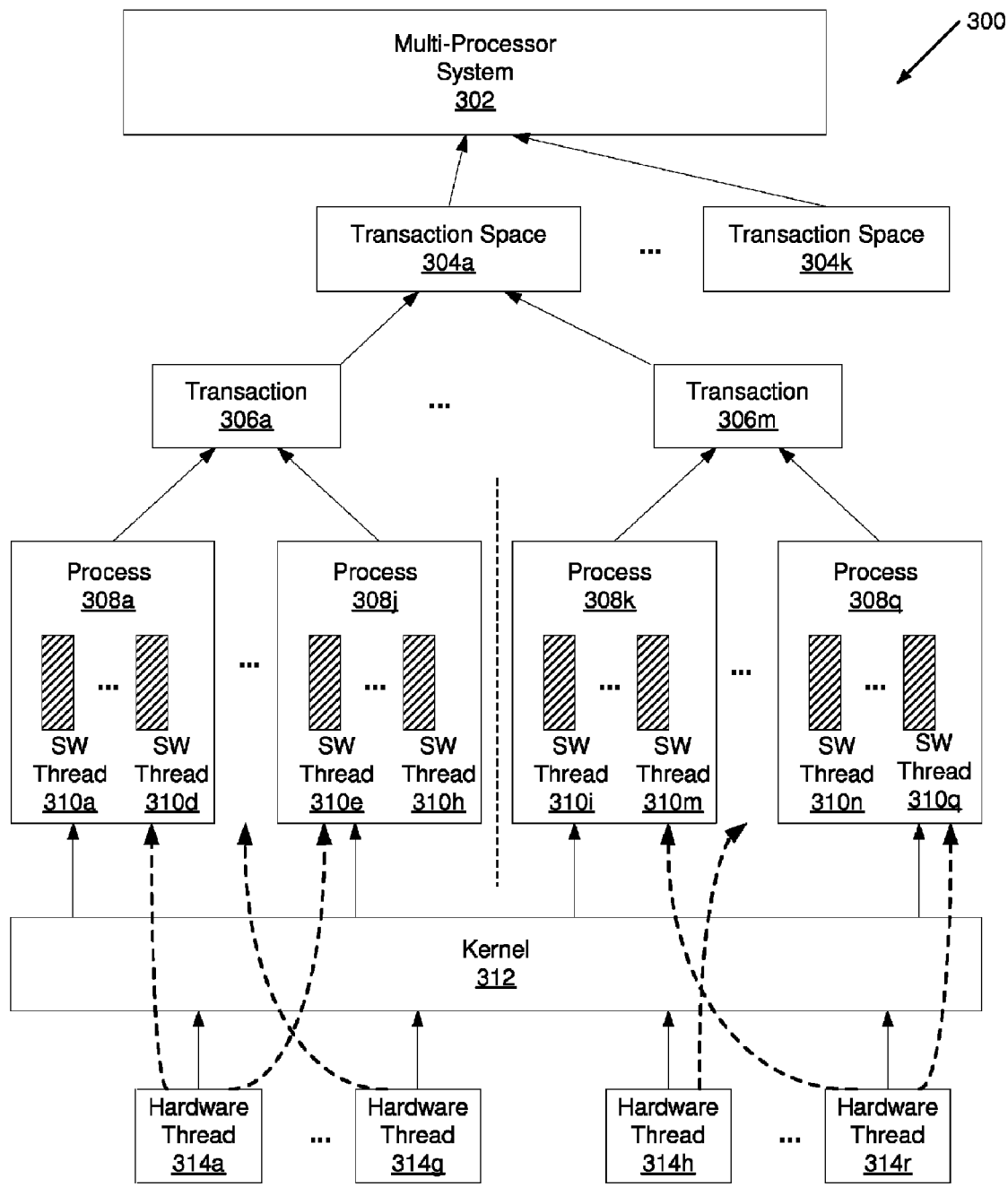
FIG. 3 is a block diagram illustrating the interactions between different hardware and software components as a transaction executes.

FIG. 3 illustrates one embodiment of transactional memory scoping 300. Here the partitioning of hardware and software resources and their interrelationships during the execution of one or more applications is shown. In one embodiment, the operating system on the nodes in multiprocessor system 302, which may, for example, reprise the resources of system 100 and/or 170, allocates regions of memory for the transaction spaces 304a-304k. As described earlier, transaction spaces 304 may be configured to store primary and replica undo logs, collision tags, and/or transactional or physical memory. A transaction may comprise one or more operations, which perform read and/or write operations to physical memory. These read and write operations may occur in an atomic manner, such that intermediate states are not visible to other transactions. In one embodiment, the software maintains which regions of the transaction spaces 304 are available for the execution of transactions 306 and handles the condition wherein insufficient space is available for transaction execution.

When a transaction executes, it may comprise multiple processes, such as Processes 308a-308j and 308k-308q in FIG. 3. In such an embodiment, each process 308 may correspond to a transaction and each process 308 owns its own resources such as an image of memory, or an instance of instructions and data before application execution. Also, each process 308 may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Multi-processor system 302 typically supports many processes. Within each of the processes 308 may be one or more software threads. For example, Process 308a comprises SW Threads 310a-310d. A thread can execute independent of other portions of the transaction and a thread can execute concurrently with other portions of the transaction.

Generally speaking, each of the threads 310 belongs to only one of the processes 308. Therefore, for multiple threads of the same process, such as SW Thread 310a-310d of Process 308a, the same data content of a memory line, for example the line of address 0xff38, will be the same for all threads. This assumes the inter-thread communication has been made secure and handles the conflict of a first thread, for example SW Thread 310a, writing a memory line that is read by a second thread, for example SW Thread 310d. However, for multiple threads of different processes, such as SW Thread 310a in Process 308a and SW Thread 310e of Process 308j, the data content of memory line with address 0xff38 will more than likely be different for the threads. However, multiple threads of different processes may see the same data content at a particular address if they are sharing the same transaction space.

In general, for a given application, kernel 312 sets up an address space for the application, loads the application's code into memory, sets up a stack for the program, branches to a given location inside the application, and begins execution of the application. Kernel 312 may further determine a course of action when insufficient memory is available for the execution of a transaction. As stated before, an application may be divided into more than one process and network 302 may be running more than one application. Therefore, there may be several processes running in parallel. Kernel 312 may decide at any time which of the simultaneous executing processes should be allocated to the processor(s). Kernel 312 may allow a process to run on a core of a processor, which may have one or more cores, for a predetermined amount of time referred to as a time slice.

In one embodiment, only one process can execute at any time per processor core, CPU thread, or Hardware Thread. In FIG. 3, Hardware Threads 314a-314g and 314h-314r comprise hardware that can handle the execution of one of the processes 308. This hardware may be a core of a processor where a processor includes one or more cores. The dashed lines in FIG. 3 denote assignments and do not necessarily denote direct physical connections. Thus, for example, Hardware Thread 314a may be assigned for Process 308a. However, later (e.g., after a context switch), Hardware Thread 314a may be assigned for Process 308j. A further description of these assignments is provided below.

In one embodiment, an ID is assigned to each of the Hardware Threads 314. This Hardware Thread ID, not shown in FIG. 3, but is further discussed below, is used to assign one of the Hardware Threads 314 to one of the Processes 308 for process execution. Kernel 312 typically handles this assignment. For example, similar to the above example, a Hardware Thread ID may be used to assign Hardware Thread 314r to Process 308k. This assignment is performed by kernel 312 prior to the execution of any applications, and thus, prior to the assignment and the use of any Transaction Spaces 304a-304k.

Referring again to FIG. 2, if processor unit 202, that lies in system 100, contains 4 processors 204, with each processor containing two cores, then processor unit 202 may be assigned HW Thread IDs 0-7 with IDs 0-1 assigned to the cores of processor 204a, IDs 2-3 assigned to the cores of processor 204b, etc. HW Thread ID 2, corresponding to one of the two cores in processor 204b, may be represented by Hardware Thread 314r in FIG. 3. As discussed above, assignment of a Hardware Thread ID 2 to Hardware Thread 314r may be performed by kernel 312 prior to the execution of any applications, and thus, prior to the assignment and to the use of any Transaction Spaces 304a-304k. Later, as applications are being executed and processes are being spawned, processes are assigned to a Hardware Thread for process execution. For the soon-to-be executing process, for example, Process 308k in FIG. 3, an earlier assignment performed by kernel 312 may have assigned Hardware Thread 314r, with an associated HW Thread ID 2, to handle the process execution. Therefore, in FIG. 3, a dashed line is shown to symbolically connect Hardware Thread 314r to Process 308k. Accordingly, in this example, one of two cores in processor 204b of FIG. 2 will handle the execution of Process 308k.

Later, a context switch may be requested, perhaps due to an end of a time slice. At such a time, Hardware Thread 314r may be re-assigned to Process 308q. In such a case, data and state information of Process 308k is stored by kernel 312 and Process 308k is removed from Hardware Thread 314r. Data and state information of Process 308q may then be restored to Hardware Thread 314r, and process execution resumes.

Figure 4:
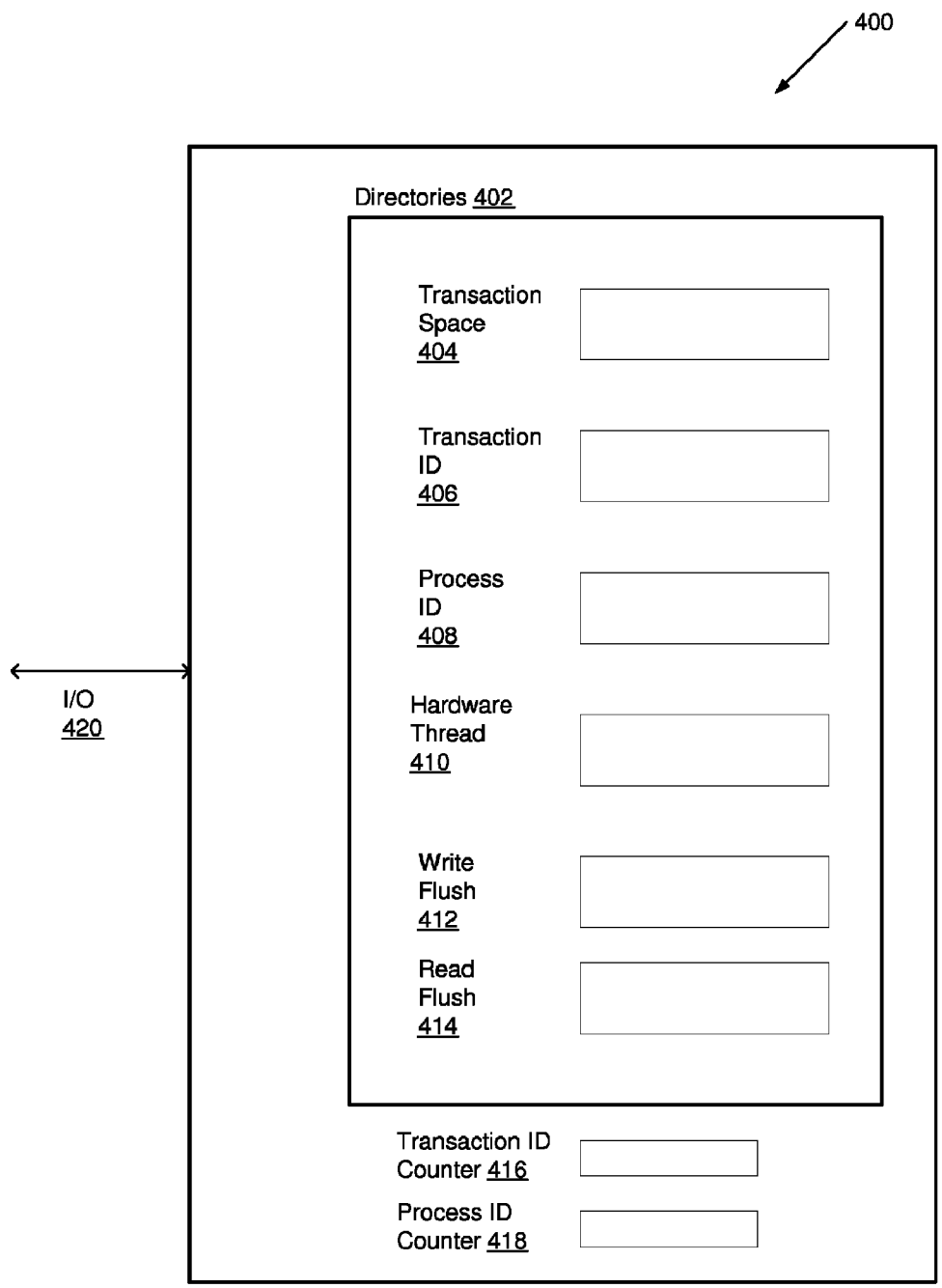
FIG. 4 is a block diagram of one embodiment of a wiretap unit.

Turning now to FIG. 4, one embodiment of a wiretap unit (WT Unit) 400 is shown. In one embodiment, WT Unit 400 may include an interface, I/O 420, which allows WT Unit 400 to interface with one or more processors, memory, a network, and otherwise. The interface 420 may be configured to include hyper-transport links in an embodiment that may include AMD Opteron™ processors in nodes 102 in system 100. In such an embodiment, the I/O interface 420 may be a Hyper Transport bidirectional high-bandwidth, low-latency computer bus. Hyper Transport is packet-based and the packet for the application may include a Hardware Thread ID as described above. The Hardware Thread ID may be used to index a Hardware Thread Directory 410. Alternatives to a Hyper Transport bus, such as a shared bus architecture, are contemplated as well.

Each WT Unit 400 may include Directories 402 of locations of information related to the transactional memory on system 100. For example, Transaction Space Directory 404 may include an array of entries, each of which corresponds to information that is maintained during the execution of an application. Such information may include pointers to the start and end of a region of physical memory, which corresponds to a given transaction space. The setup of this region of memory will be described in greater detail below. In one embodiment, the data within this region of physical memory may include the locations of both the original and copies of memory used during the execution of an application, a value denoting the number of copies of transaction spaces, values denoting the nodes of the original and copies of transaction spaces, and pointers to the start and end of logs used to track collisions, or data conflicts.

Transaction ID Directory 406 may include information such as the Transaction Space ID (e.g., of Transaction Spaces 304 in FIG. 3), pointers to the head of a Write Flush Directory 412 and a Read Flush Directory 414, values denoting the nodes of the original and copies of transaction spaces, and pointers to the start, end, and current entry of logs used to track operations performed on the memory state in order to possibly later restore the memory state to a predetermined state.

Process ID Directory 408 may be configured to include a map between IDs assigned to processes that make up an application and IDs that denote which transaction comprises a particular process.

Hardware Thread Directory 410 may be configured to include a map between a hardware thread ID that denotes which piece of hardware, such as a core of a processor, will handle the execution of a particular process and IDs assigned to processes that make up an application Write Flush Directory 412 may include a list of memory locations (e.g., cache lines) that have been written to for each transaction in progress. When a transaction completes, its corresponding list of cache writes is traversed and each cache line is flushed, or written-back to memory. The entries of this directory may contain a cache ID, the tag of the cache line, and state information.

Read Flush Directory 414 may include a list of cache lines that have been read for each transaction in progress. In one embodiment, when a transaction completes, its corresponding list of cache reads is traversed and each cache line is invalidated. The entries of this directory may contain a cache ID, the tag of the cache line, and state information.

Transaction ID Counter 416 may be configured to store a value that is used to assign Transaction IDs as transactions are started. Afterwards, this value may be incremented. Transaction IDs are stored in Process ID Directory 408 and are used to index Transaction ID Directory 406.

Process ID Counter 418 may be configured to store a value that is used to assign Process IDs as processes are started. As above, this value may be incremented. Process IDs are stored in Hardware Thread Directory 410 and are used to index Process ID Directory 408.

Figure 5:
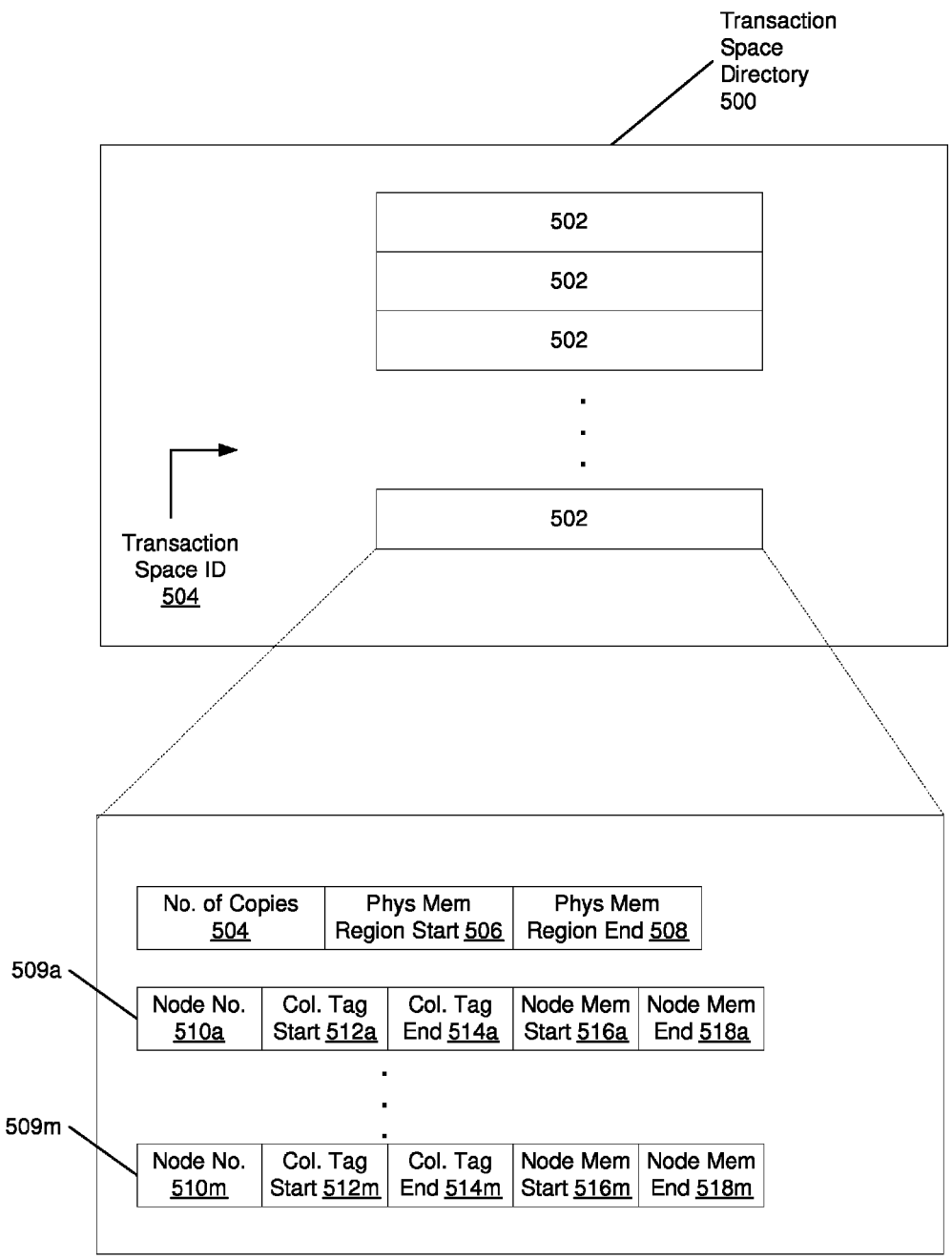
FIG. 5 is a block diagram of one embodiment of a Transaction Space Directory within a wiretap unit.

FIG. 5 illustrates one embodiment of a Transaction Space Directory 500. In one embodiment, directory 500 may be comprised of an array of entries such as Directory Entry 502. The array may be indexed by Transaction Space ID 504. Transaction Space ID 504 may be supplied by Kernel 312 and it may be determined by Kernel 312 before an application is executed or available for execution. Directory Entry 502 may contain information to be maintained during the execution of an application.

Depicted in FIG. 5 is one embodiment of Directory Entry 502. For the embodiment shown, entry 502 includes Phys Mem Region Start 506 and Phys Mem Region End 508, which may identify the start and end of a region of physical memory. The identified region of memory may store the original and/or copies of data used during the execution of an application. Also, this region of memory may store copies of memory addresses of lines written during execution of the application. These addresses are later compared for collision, or data conflict, detection. No. of Copies 504 holds the value of the number of copies 509a-509m of memory and tag addresses to be used during application execution. For each copy 509, several fields may be maintained during application execution. Looking at copy 509a, the fields include Node No. 510a. This field denotes which node in the system holds the region of memory for this copy. The next two fields detail the location of collision tags for this copy. They are Col. Tag Start 512a and Col. Tag End 514a. These two fields are pointers to the start and end of the region of memory that holds the log of these tag addresses. The data on which the operations are performed lies in the region of memory set by the pointers, Node Mem Start 516 and Node Mem End 518a. As may be expected, wherein beginning and end pointers are depicted, other embodiments are possible and are contemplated. For example, a base address and size or offset could be used to denote a region of memory.

Figure 6:
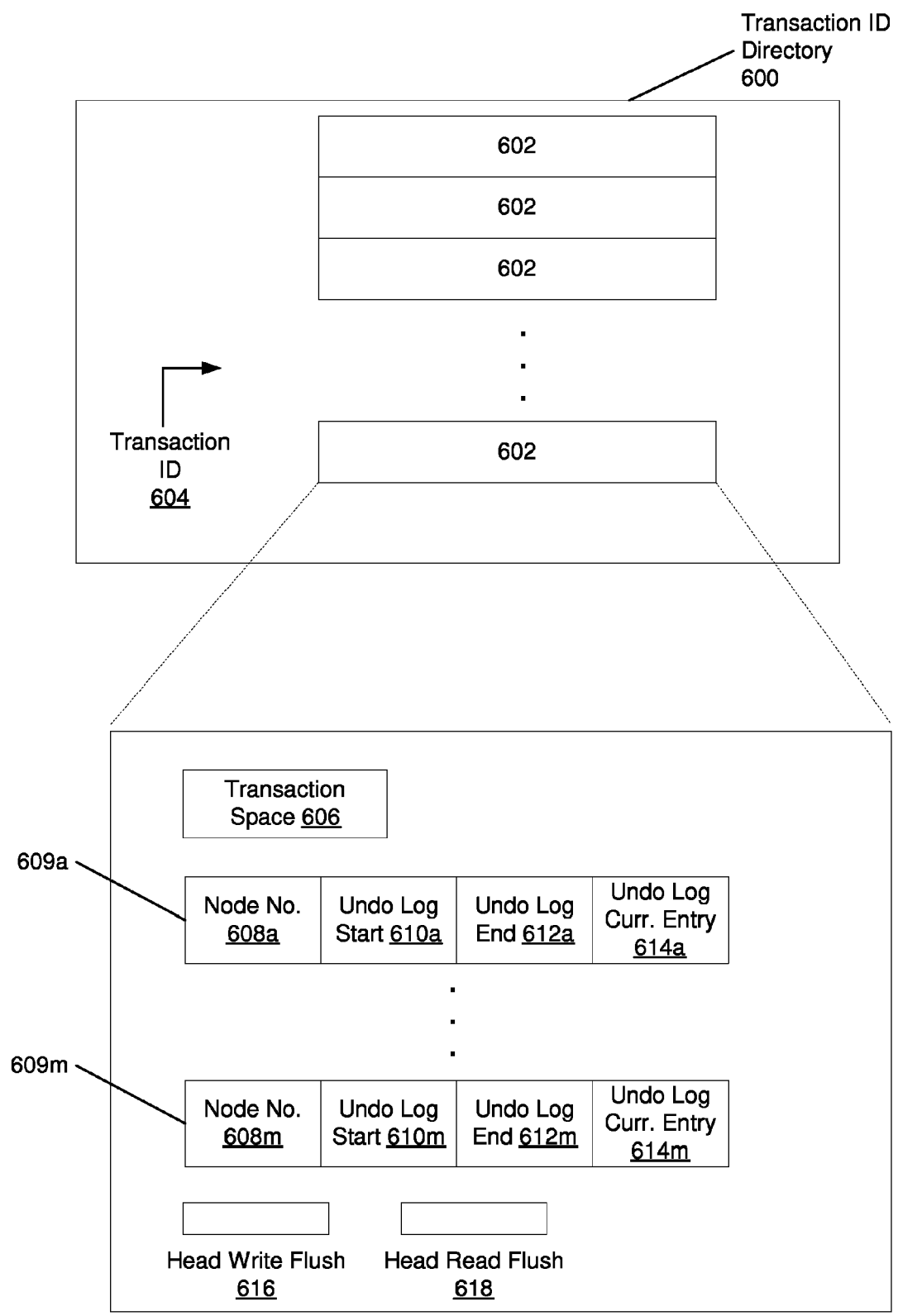
FIG. 6 is a block diagram of one embodiment of a Transaction ID Directory within a wiretap unit.

FIG. 6 illustrates one embodiment of a Transaction ID Directory 600. In one embodiment, directory 600 may be comprised of an array of entries such as Directory Entry 602. The array may be indexed by Transaction ID 604, which may be provided by a counter 416 in WT Unit 400. Directory Entry 602 may contain information to be maintained during the execution of an application. Further details of Directory Entry 602 are provided here.

Depicted in FIG. 6, there is shown one embodiment of Directory Entry 602. Here may be found Transaction Space ID 606 to determine which of the Transaction Spaces is to be used for the next application and to index the Transaction Space Directory. The number of copies of data used during the execution of an application, logs of operations performed on original and copies of the memory state, and logs of tag addresses is located in Transaction Space Directory described above. For each copy, several fields may be maintained in Transaction Space Directory and Transaction ID Directory during application execution. Here, for Transaction ID Directory 600, looking at copy 609a the fields begin with an index, Node No. 608a. This field denotes which node in the system holds the region of memory for undo logs for this copy.

The next three fields identify the location of the Undo Log for this copy. They are Undo Log Start 610a, Undo Log End 612a, and Undo Log Curr. Entry 614a. The first two fields are pointers to the start and end of the region of memory that holds the Undo Log, or list of operations performed on the data during application execution. The third field, Undo Log Curr. Entry 614a, is a pointer to the current entry of the list of operations. The data on which the list of operations is performed lies in the region of memory set by the pointers, Node Mem Start and Node Mem End in Transaction Space Directory described above. Also, there may be a pointer, Head of Write Flush List 616, used to locate a list of dirty cache lines that need to be written-back to memory during a transaction commit or transaction abort operation. A pointer, Head of Read Flush List 618, may be used to locate a list of cache lines that need to be invalidated during a transaction commit or transaction abort operation.

Figure 7:
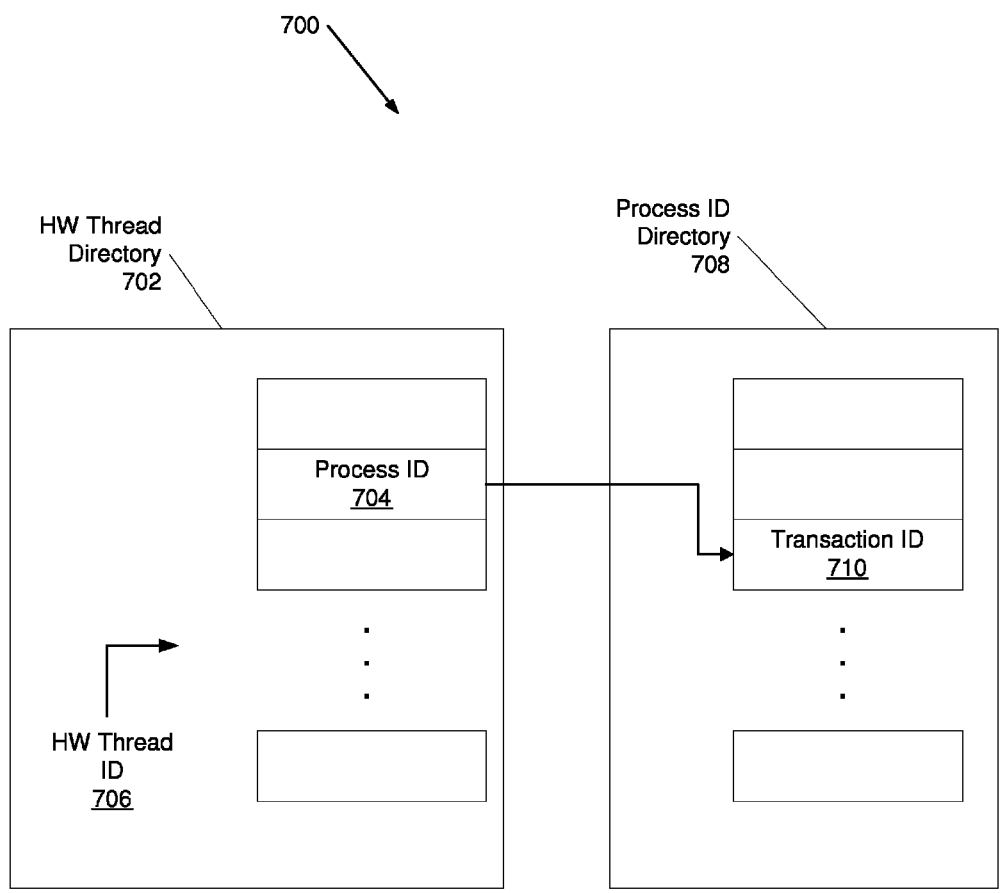
FIG. 7 is a block diagram of one embodiment of a HW Thread Directory and a Process ID Directory within a wiretap unit.

Referring to FIG. 7, one embodiment of both a Hardware Thread Directory 7102 and a Process ID Directory 708 is illustrated. Process ID Directory 708 may be configured to include an assignment of HW Thread IDs and Process Ids. In one embodiment, Process ID 704 may be obtained from the Process ID counter in the WT Unit when a new process is spawned and then it is written into Hardware Thread Directory 702. When process execution is ready, HW Thread ID 706, which may be supplied via a bus interface to the WT Unit, indexes Hardware Thread Directory 702 to produce Process ID 704, which was previously written into Hardware Thread Directory 702. Now Process ID 704 is used to index Process ID Directory 708 to produce Transaction ID 710, the ID used to index the Transaction ID Directory.

Figure 8:
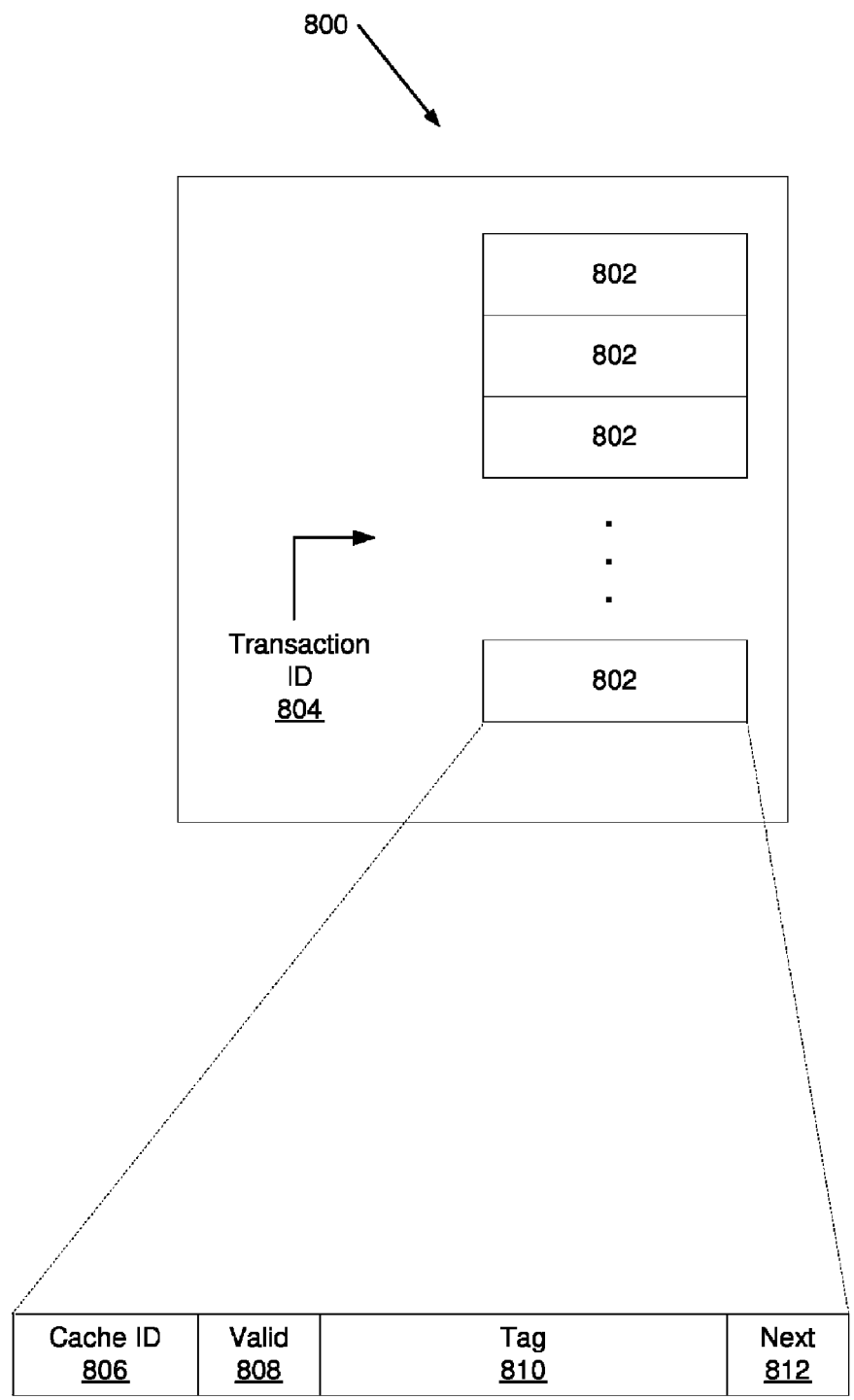
FIG. 8 is a block diagram of one embodiment of a Write and/or a Read Flush Directory within a wiretap unit.

FIG. 8 serves to illustrate one embodiment of both a Write Flush Directory and a Read Flush Directory, since they may be structurally similar. Directory 800 is indexed by Transaction ID 804. As mentioned above, Transaction ID 804 is obtained from the Process ID Directory. Both Write Flush Directory and Read Flush Directory may be accessed during a transaction commit or transaction abort operation. Details of these operations are given below.

A Directory Entry 802 is obtained from indexing directory 800 and FIG. 8 illustrates one embodiment of this entry. Cache ID 806 provides a pointer to the location of the cache (such as which node, which processor and which cache within that processor) containing the memory line. Valid 808 determines whether or not the corresponding memory line is valid or invalid. Tag 810 is the tag address of the memory line. Next 812 is a pointer to the next entry in Write Flush List or Read Flush List, or the value is NULL denoting the end of either list.

Overview of a Transaction Operation

Referring again to FIG. 3, as discussed above, kernel 312 may assign a Hardware Thread ID to each of the Hardware Threads 314 prior to any applications beginning execution. A flow of events can be thought of as directed from top-to-bottom when a new application begins, and the opposite, a bottom-to-top flow is followed when a context switch occurs. However, Kernel 312 actually has control over different steps in the operations and does not participate in a flow of events solely based on its position in FIG. 3. A description of both flows follows.

For example, for a new application, Kernel 312 may find an already allocated free Transaction Space 304*a* with an associated Transaction Space ID=2 that was previously assigned by Kernel 312. At this time, it is known that Transaction Space ID=2 corresponds to a node in system 100. As used herein, a node and its contents are referred to as initiating (e.g., initiating node, initiating WT Unit, etc.) if the node includes the chosen processor to execute the transaction. Therefore, the initiating WT Unit of the initiating Processor Unit will be accessed for information stored in its directories as setup continues. Entry 2 of the Transaction Space Directory in the initiating WT Unit already has the pointers to the start and end of the logs for collision tags and the regions of physical memory for both primary and replica memories. This information was written by Kernel 312 prior to the execution of any applications.

Kernel 312 may determine a certain number of Transactions 306 is needed to complete the new application. For this example, in FIG. 3, we will follow Transaction 306*a* with an associated Transaction ID=27 assigned by the Transaction Counter in the initiating WT Unit. Entry 27 of the Transaction ID Directory in the initiating WT Unit already has the pointers to the start, end, and current entry of the undo logs and the heads of the Write Flush List and the Read Flush List. This information was written by Kernel 312 prior to the execution of any applications.

Transaction 306*a* may be divided into multiple processes by Kernel 312 and we will follow Process 308*a* with an associated Process ID=42 assigned by the Process ID Counter in the initiating WT Unit. Entry 42 of Process ID Directory 702 is written by Kernel 312 at this time with the value of Transaction ID=27.

Now Kernel 312 determines which processor will handle the execution of Process 308*a* with an associated Process ID=42. For example, if the initiating Processor Unit has 4 processors, each processor with two cores, then Kernel 312 may assign the second core of the third processor to execute this process. For this example, the second core of the third processor will be associated with Hardware Thread 314*g* with an associated Hardware Thread ID=36 previously assigned by Kernel 312. Entry 36 of Hardware Thread Directory 710 is written by Kernel 312 at this time with the value of Process ID=42. Now all assignments have been completed and the top-to-bottom flow of FIG. 3 is completed. The application may begin execution.

During application execution, each time a memory access occurs, either the Write Flush Directory or the Read Flush Directory is updated with the tag address of the cache line. These two lists of cache lines may be used during the Commit and Abort operations described below.

When an initiating processor sends a castout to primary memory, the initiating WT Unit records the corresponding address of that particular cache line and stores the address along with the corresponding Transaction ID in the Collision Logs. During execution, two different transactions may accidentally write to the same physical memory. For example, other transactions may be executing concurrently with Transaction 306*a* (with associated Transaction ID=27). One other possible concurrent transaction may be Transaction 306*m* with associated Transaction ID=74, which was assigned by the Transaction Counter in a different WT Unit in a different Processor Unit than the initiating versions currently being described. Transaction 306*m* may have already performed a write operation on global address 0d186 that corresponds to a line of memory in the second mentioned processor of the second mentioned Processor Unit. This address, 0d186, is recorded in the Collision Tags of Transaction 306*m*. The location of these particular logs may be found in Transaction Space Directory of the corresponding WT Unit. Now Transaction 306*a* (Transaction ID=27) wishes to write to global address 0d186. Therefore, the first WT Unit may use a RDMA network to send a write request to the second mentioned WT Unit. This second mentioned WT Unit corresponding to Transaction 306*m* compares the address of the write operation (0d186) and the Transaction ID (ID=27, not 74) in the Collision Tags and it will get a hit, since this physical memory line had already been written or read. In response, an interrupt or software trap may be generated.

Assuming there is no interrupt due to a data conflict a context switch may later occur and the second core of a processor associated with Hardware Thread ID=36, may need to switch out of its current state, or context, in order to execute an entirely different process, say Process 308*q* with an associated Process ID=57. Kernel 312 needs to overwrite Hardware Thread Directory in the WT Unit. For example, entry 36 of Hardware Thread Directory now needs the value 42 replaced with the value 57, which corresponds with the new process—Process 308*q* with an associated Process ID=57. Following FIG. 3 in a bottom-to-top fashion, it can be seen that Process ID Directory is indexed with a different value (57 in place of 42) and it now produces a different Transaction ID. For example, entry 57 of Process ID Directory may produce the value Transaction ID=61 in place of the previous Transaction ID=27.

Now entry 61 of the Transaction ID Directory may produce the value Transaction Space ID=83 in place of the previous Transaction Space ID=2. And entry 83 of the Transaction Space Directory contains pointers to different regions of memory than where application execution was occurring.

Later, another context switch may occur and the new process to execute is Process 308*a* again with associated Process ID=42. The above steps for a context switch repeat and afterwards, application execution may resume on the first transaction listed at the beginning of this example (i.e. Transaction Space ID=2, Transaction ID=27, Process ID=42, Hardware Thread ID=36).

Figure 9:
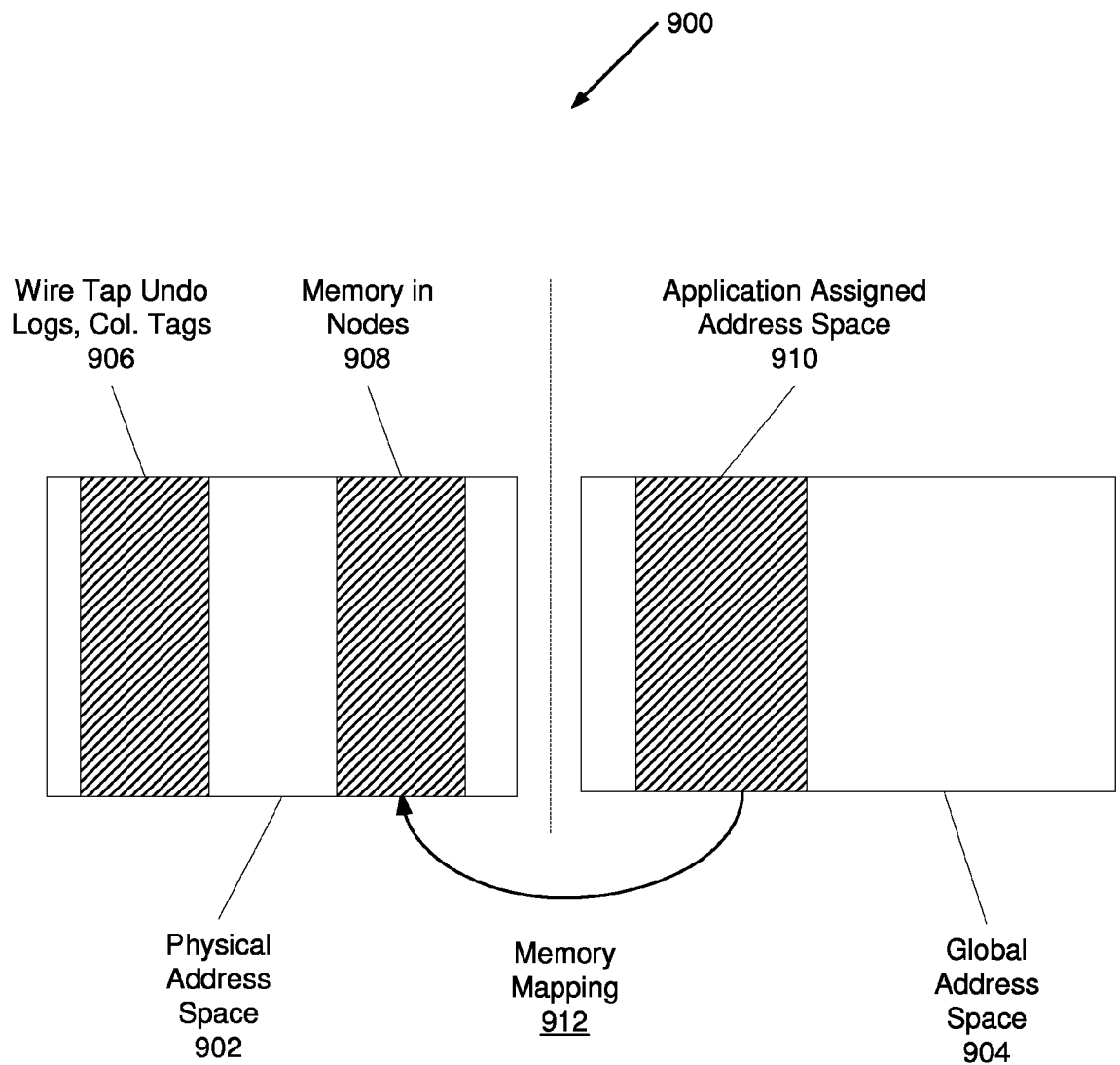
FIG. 9 is a block diagram illustrating one embodiment of memory mapping between global and physical address spaces.

FIG. 9 illustrates one embodiment of memory mapping 900. Mapping 900 may occur between a global virtual address space 904 and physical address space 902 of system 100. In general, the operating system may move data between physical locations to improve performance or ensure reliability. In one embodiment, for each application, the operating system creates a virtual memory space. These virtual addresses are then mapped to the physical addresses in the field Memory in Nodes 908 through Memory Mapping 912. Addresses 908 are the addresses of memory of the processors in the node running the application. Memory Mapping 912 may be implemented with a combination of a translation lookaside table (TLB) and a page table. Also, Wire Tap Undo Logs and Collision Tags 906 are stored in Physical Address Space 902. Wire Tap Undo Logs 906 are used to store operations performed on memory 908 during the execution of an application (e.g., between commits). Later, if necessary, the memory state of the last successful commit may be restored by traversing the operations in Wire Tap Undo Logs 906. Also, there are tag addresses, Col. Tags 906, that are used to detect data conflicts.

As stated above, WT Unit is configured to interface with the WT Unit of other nodes, and thus, access the memory and processors of other nodes. For example, an application running on a processor of a first Processor Unit in a first Node may need to modify a line with an address in global address space that corresponds to a line in physical memory of a second Node such as the DRAM of a processor of a second Processor Unit. The WT Unit in all nodes contain access to this mapping. In this case, the WT Unit in the first Processor Unit may interface with the WT Unit of the second Processor Unit in order to allow the application to manipulate the memory on the other node.

Overview of a Setup Operation

One of the first operations in system 100 is setup. During setup, the operating system may allocate space in physical memory as shown in FIG. 9. The allocated space for the execution of the application in physical memory may be configured to store primary memory and copies of primary memory, or replica memory. The allocated space may also be configured to store undo logs and collision tags. These regions of memory may be defined by pointers found in the Transaction Space Directory and the Transaction ID Directory. Once applications are executing, multiple applications may be executed simultaneously, and therefore, occupying Transaction Spaces. The operating system (e.g., Kernel) may handle the case when sufficient memory is not available for a new application that needs to be allocated in a Transaction Space while other multiple applications are already executing. In one embodiment, the kernel is aware of the hardware in system 100 and the operating system (O.S.) ensures the application accesses a virtual memory range determined by the WT Units in system 100. In one embodiment, a combination of a translation lookaside buffer and a page table may be used to perform the memory mapping. All WT Units of all nodes may include this mapping or have access to this mapping.

Figure 10:
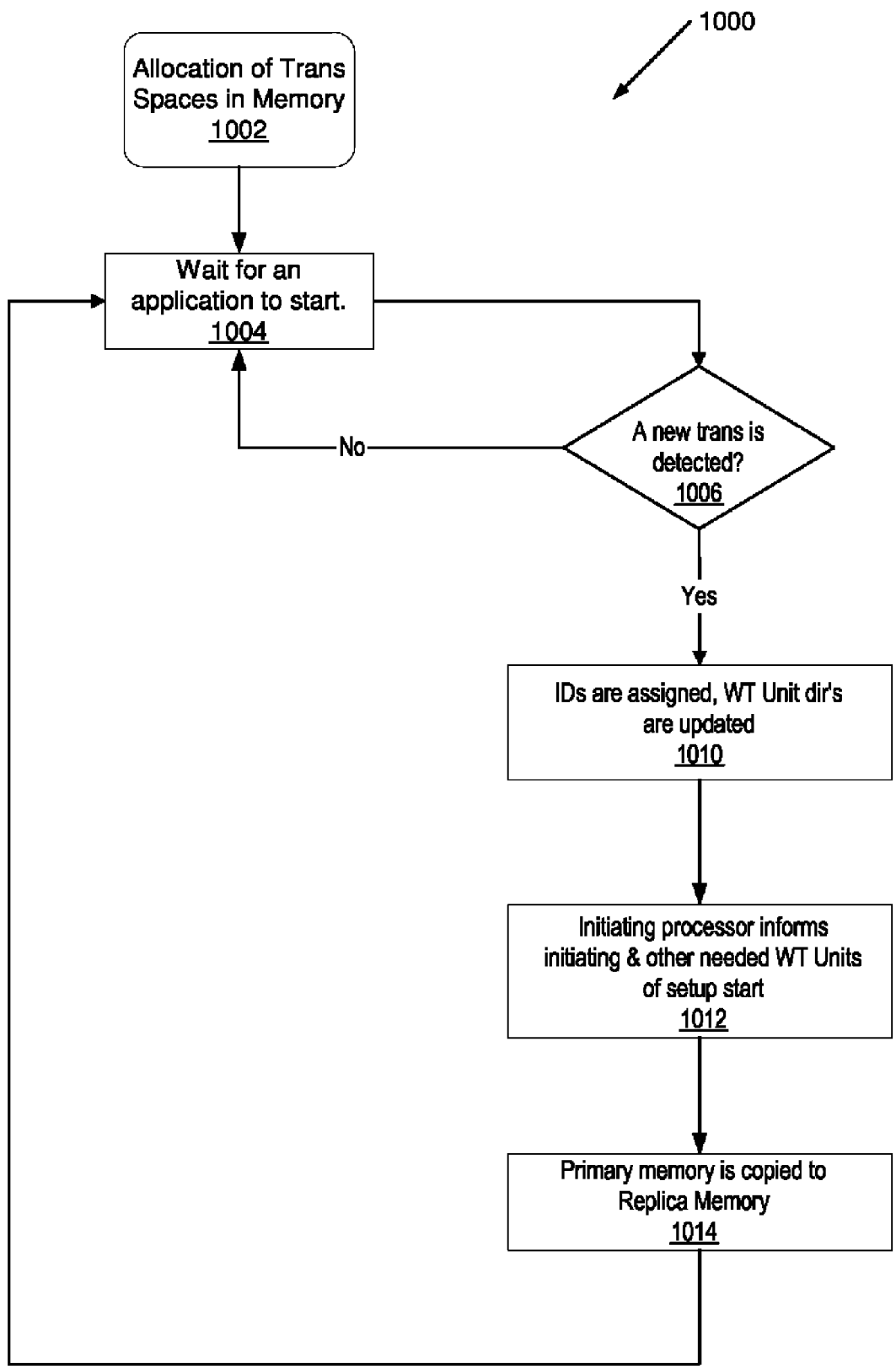
FIG. 10 is a flow diagram of one embodiment of a method for setting up a cluster of nodes for memory replication.

Referring now to FIG. 10, there is shown a flow diagram illustrating one embodiment of a method for setup of transactional memory on system 100. For purposes of discussion, the steps in this embodiment are shown in sequential order. However, some steps may occur in a different order than shown, some steps may be performed concurrently, some steps may be combined with other steps, and some steps may be absent in another embodiment. In the embodiment shown, the O.S. allocates regions of memory for multiple transaction spaces in block 1002. Next, the O.S. monitors the nodes in system 100 (block 1004). During this monitoring, a new transaction or a previously failed transaction that is reattempting execution may be detected in decision block 1006. If this does not occur method 1000 returns to block 1004. A Transaction Space ID is assigned to the application (block 1010). Additionally, a number of transactions may be determined, Transaction IDs are assigned, the transactions may be divided into processes, Process IDs are assigned, and finally, a processor core is assigned to handle the application execution and the appropriate Hardware Thread ID is assigned and all directories in the initiating WT Unit and other needed WT Units of the appropriate nodes are updated. For example, other nodes, such as nodes 102b-102c in systems 100 and 170 in FIGS. 1A and 1B, may be needed to perform the execution of the transaction and maintain durability.

In block 1012, the initiating processor of the initiating node informs the initiating WT Unit and the other needed WT Units that setup has begun. This communication may be performed by interfaces to a RDMA network. In one embodiment, the initiating WT Unit may need to wait for an acknowledgment signal from all other needed nodes after informing the these nodes of the start of setup. If all acknowledgment signals do not arrive in a predetermined time, the O.S. of the initiating node may be signaled to handle the current wait state and/or have setup begun again. Another alternative may be to not include acknowledgment signals from the other needed nodes, and instead, the next step is taken. Primary memory is copied to the replica memories in block 1014. Again, an RDMA network may be used for the transmission of primary memory contents. Upon completion of the copying, the method returns to block 1004.

Overview of the Wiretap Operation

Figure 11:
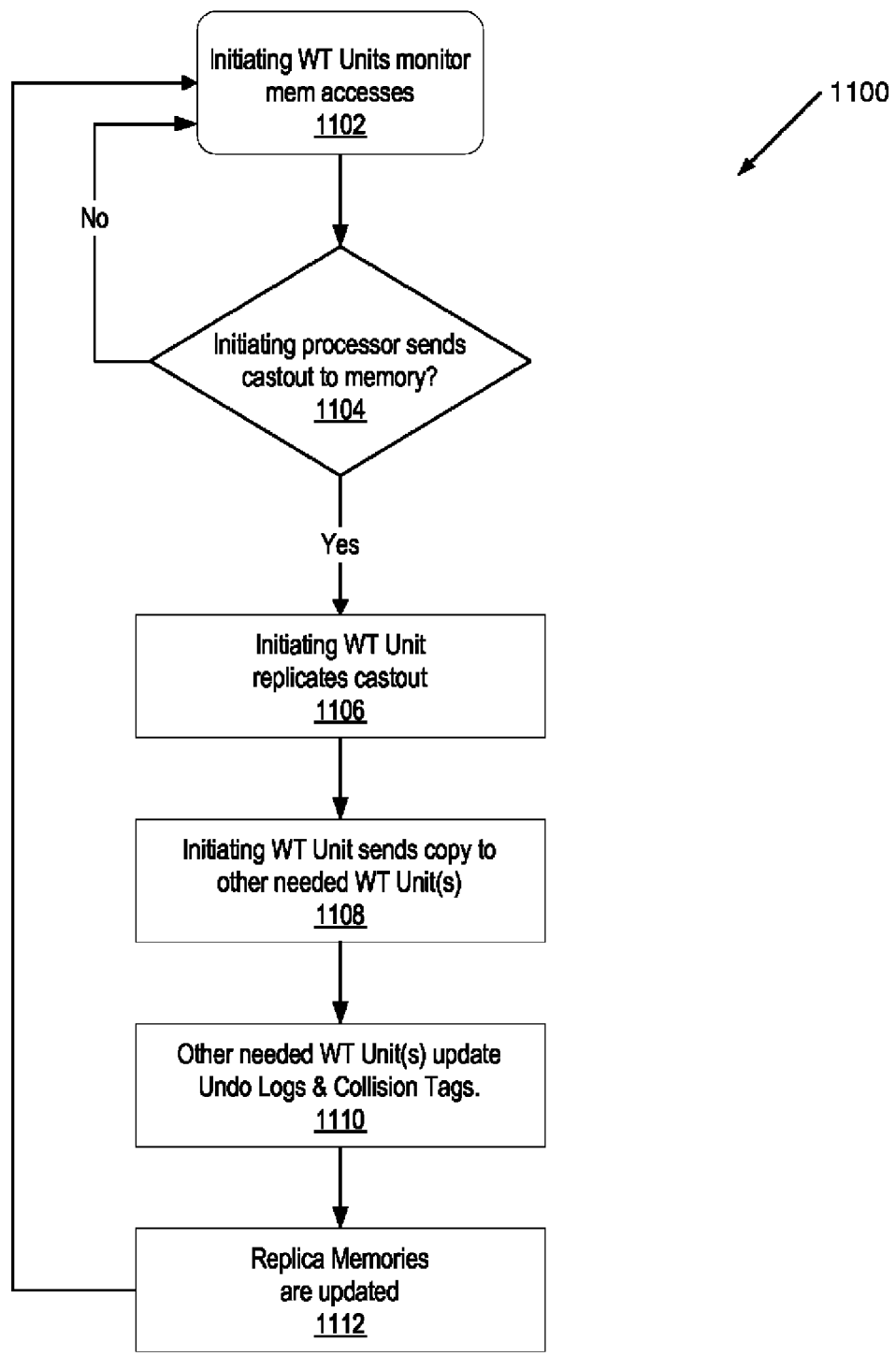
FIG. 11 is a flow diagram of one embodiment of a method for updating both copies of memory used for a transaction and a log of memory changes.

FIG. 11 is a flow diagram of one embodiment of a method for memory line wiretap on system 100. As before, WT Unit monitors memory accesses. Block 1102 shows this operation for initiating nodes. If in decision block 1104, the initiating processor issues a castout, the initiating WT Unit makes a replica, or duplicate of the castout (block 1106). If the castout corresponds to an entry in primary memory in the initiating node, then the initiating WT Unit may read the entry, in this primary memory, corresponding to the castout and write the contents along with the corresponding address to the initiating undo log. The initiating WT Unit may update the initiating collision tags with the corresponding address. If the castout corresponds to an entry in primary memory on one of the other needed nodes (e.g. in FIG. 1B, memory 186c), the updates of the undo logs, collision tags and primary memory (e.g., in FIG. 1B, 182c, 184c and 186c) on that particular node may occur later by direction of the corresponding WT Unit of that particular node when that particular node receives the castout via the network. Otherwise, if the initiating processor does not issue a castout, the initiating WT Unit continues monitoring memory accesses in block 1102.

Following a replication of a castout and possible updates of the initiating undo logs and collision tags in block 1108, the initiating WT Unit sends the replica memory line to the network. The network sends the replicated memory line to other needed WT Units. At this point, in block 1110, the other needed WT Units accept the replicated memory line and perform updates of their respective undo logs and collision tags. Following in block 1112, the replicated castout is written to the replica memories. At this point, primary memory has been updated with the original castout, replica memories have been updated with the replicated castout, undo logs have been updated with a recorded change and collision tags have been updated with the appropriate address.

In one embodiment, after sending the castout to network 104, the initiating WT Unit may wait for an acknowledgment signal from all other needed nodes. If all acknowledgment signals do not arrive in a predetermined time, the O.S. may be signaled to handle the current wait state and/or have the wiretap process begun again at the point of sending the replicated memory line to the other needed nodes via the network. Another alternative may be to not include acknowledgment signals from the other nodes, and instead, the next step is taken. Following block 1112, the method returns to block 1102 where the initiating WT Unit waits for a memory access from the initiating processor.

Overview of the Commit Operation

If all instructions of a transaction complete successfully, the changes to memory that have been made in-place by the transaction become committed state. Otherwise, the pre-transaction state remains the state to maintain and be visible to other transactions until the current transaction successfully completes. Upon successful completion, software may invoke a wiretap commit request which makes the current running state of the initiating processor and primary memory become the new state to maintain. This request involves a synchronization operation to make the primary and replica states consistent.

In a synchronization operation, replica memories now need to be in a consistent state with one another and with the state of the primary memory. While an application executes on an initiating node and primary memory is updated, replica memories are no longer synchronized with the primary memory. Undo logs maintain a list of changes in order to make it possible to update replica memories to the state of primary memory.

Should a hardware or software failure occur, one of the replica nodes may become the new primary node later. Undo logs will be used to restore primary and replica memories to the state of primary memory at the pre-transaction state. Recall that the primary and replica memories may have been updated with castouts during transaction execution. This process of synchronization is initiated when software invokes the commit request after a transaction completes. A detailed description of the commit operation is given below.

Figure 12:
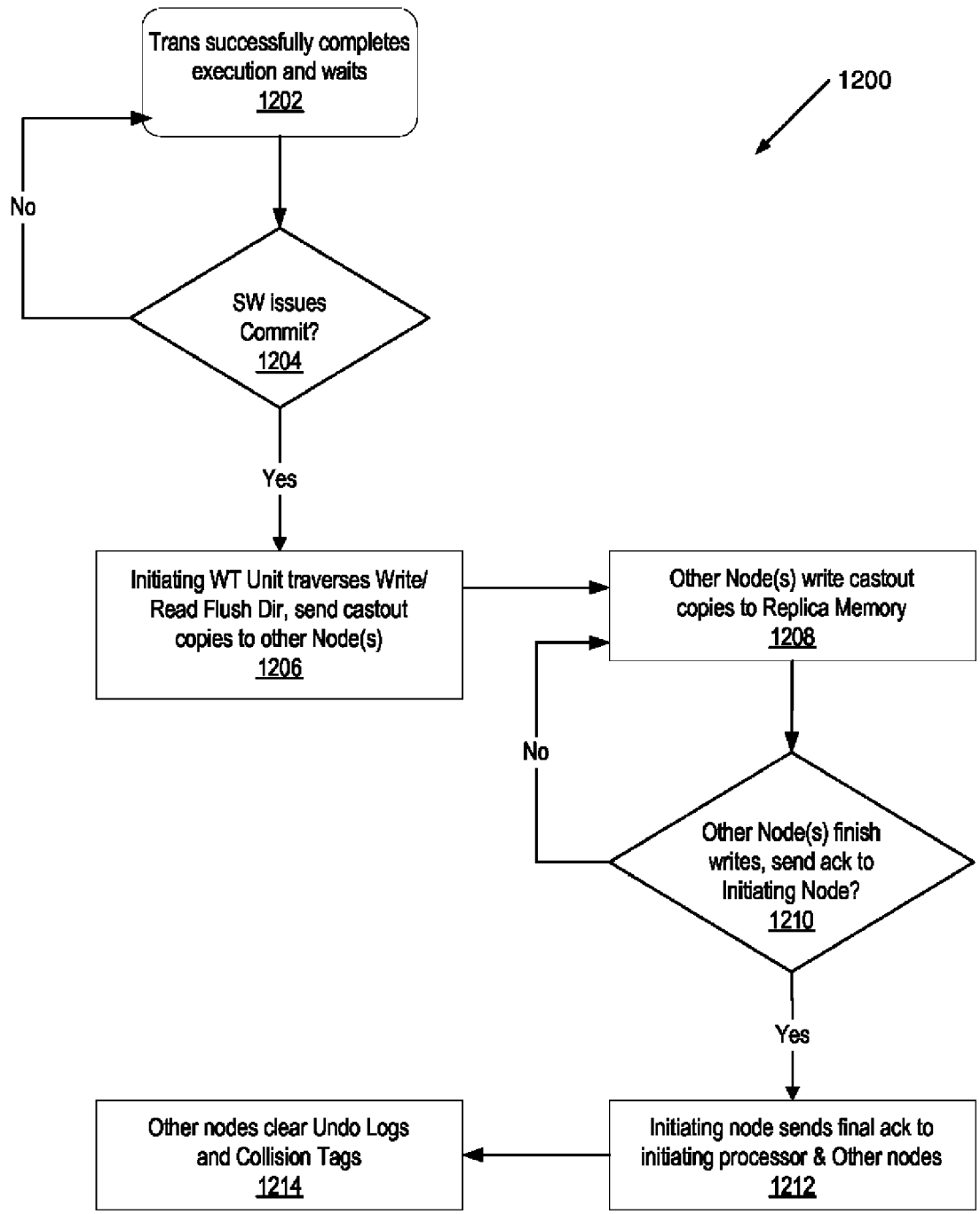
FIG. 12 is a flow diagram of one embodiment of a method for committing the memory state at the end of a successful transaction completion as the saved new memory state.

Referring to FIG. 12 a flow diagram is shown of one embodiment of a method for commit after successful completion of a transaction. In block 1202, the setup process has completed, the wiretap process may be performed when needed as an application is being executed on an initiating processor, no collision tag hits have occurred, and the transaction completes its operations.

If in decision block 1204, the application software has not invoked a commit request, method 1200 returns to block 1202 and waits for a commit. When a commit request is issued in decision block 1204, all dirty cache lines in the initiating processor are written-back to primary memory as shown in block 1206. Initiating WT Unit uses the pointer, Head Write Flush in the Transaction ID Directory, to locate the beginning of the Write Flush Directory. Similar to the Wiretap Process described above, the initiating WT Unit will notify the initiating processor to write-back the castout, or the current valid dirty line, to primary memory. Concurrently, primary WT Unit will replicate the castout and send the replicated castout to other needed WT Units via the network. Also in block 1206, all cache lines that have been read only may be invalidated. Primary WT Unit uses the pointer, Head Read Flush in the Transaction ID Director, to locate the beginning of the Read Flush Directory.

In block 1208, the other WT Units accept the replicated memory line. Depending on the embodiment, control signals may be included to distinguish between a normal castout update and a commit castout update. Therefore, the undo logs and collision tags may or may not be updated, during execution of a commit request, prior to a write operation to place the contents of the replicated castout into memory. Note that blocks 1206 and 1208—the process of traversing the Write Flush Directory, writing the original dirty cache line to primary memory, and writing the replicated line to replica memories—may be implemented in several ways. One alternative is to have the next entry of Write Flush Directory read once the original cache line is written and the replicated castouts are sent to a network. Another alternative is to wait to read the next entry until an acknowledgment signal is received from all other nodes that denotes that their respective memories have been updated. In one embodiment, buffering of the original castout and copies may be used to pipeline the write-back procedure or send the castout lines in groups. Another alternative is to have only one acknowledgment signal sent by the other nodes in response to a signal from the initiating node identifying a castout copy is from the final entry, rather than a write-complete acknowledgment signal for each castout copy.

In decision block 1210, the steps in blocks 1206 and 1208 are performed until the final entry of Write Flush Directory is reached and all other nodes send an acknowledgment to the initiating node of the completed write-back of this final castout copy. If the final entry has been copied and written-back to all replica memories and the initiating processor is made aware of this fact, then in block 1212, the initiating WT Unit both sends a final acknowledgment signal to the initiating processor and, through a network, sends a final acknowledgment signal to all other nodes. Otherwise, the process may return to block 1206 or block 1208 depending on the implementation of the Write Flush Directory traversal and write-back of castout copies to the replica memories such as the examples listed earlier.

In block 1214, upon receipt of the final acknowledgment signal from the initiating WT Unit, the other WT Units clear their respective undo logs and collision tags. Replica memories are the same as, or synchronized with, primary memory, so there should be no list of needed changes to perform to restore replica memories with primary memory. In one embodiment another acknowledgment signal may be required for the other WT Units to inform the initiating WT Unit that the undo logs are successfully purged.

Overview of the Abort Operation

While a transaction is executing on the initiating node, if it experiences a hardware or software fault, the pre-transaction state may still be accessed by the other needed nodes. These nodes first need to restore the pre-transaction state by using the undo logs. The transaction can be retried later on one of the other nodes using a software-defined mechanism. Other times, software may invoke an abort operation to stop execution of a transaction and have the state restored to the pre-transactions state. Software may do this in the case of a transaction that caused a collision and, thus, a software trap. As stated above, undo logs maintain a list of changes in order to make it possible to restore primary and replica memories to the pre-transaction state. This abort operation is described below.

Figure 13:
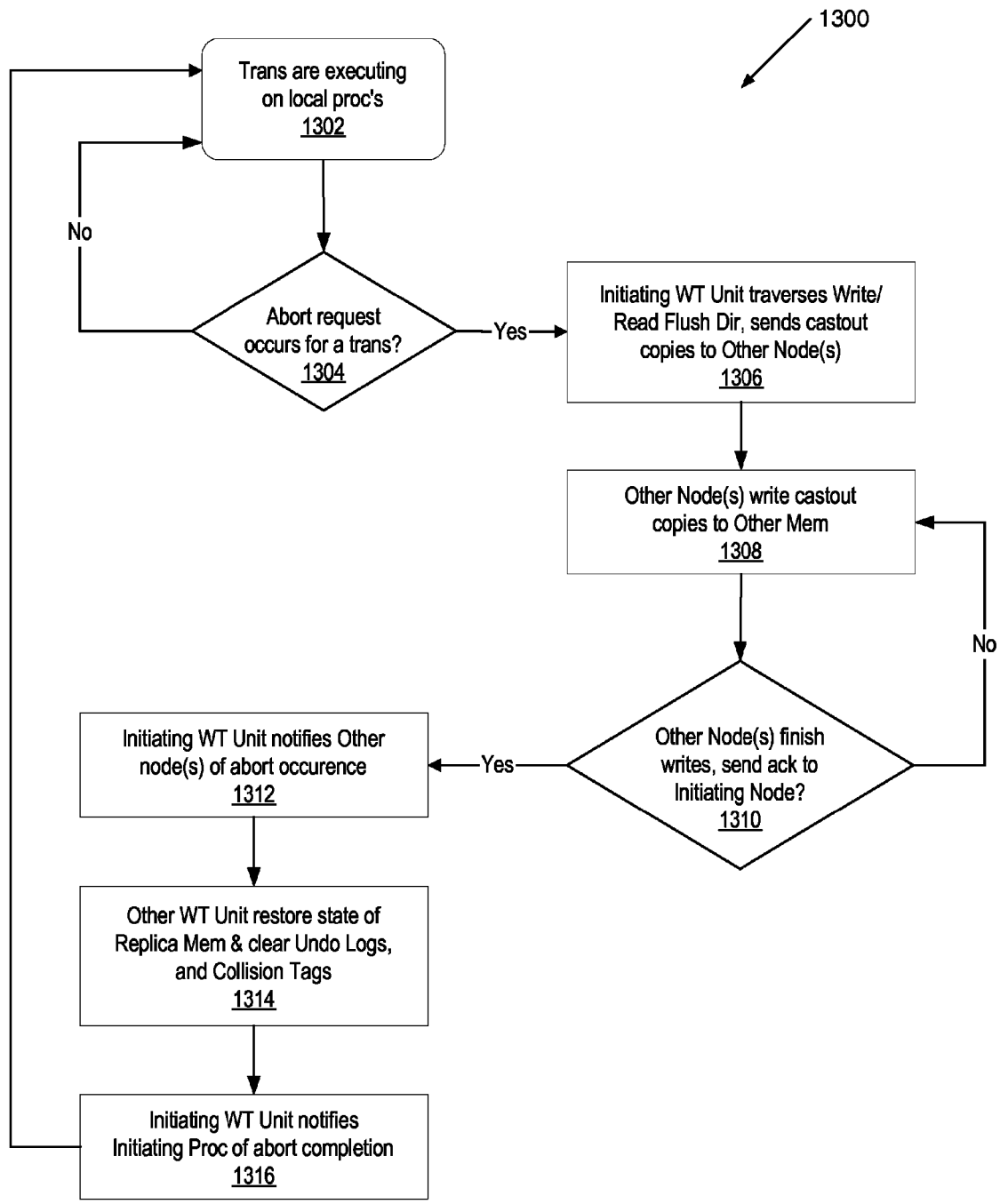
FIG. 13 is a flow diagram of one embodiment of a method for aborting a transaction executed on a cluster of nodes.

FIG. 13 is a flow diagram of one embodiment of a method of an abort operation on system 100 and/or 170 when software makes an abort request for a transaction on the initiating node. In block 1302, the setup process has completed on the initiating node, a transaction is executing on the initiating node, the wiretap process may be performed when needed as the application is being executed on the initiating node, and the transaction has not completed yet.

If in decision block 1304, software has not requested an abort operation during transaction execution, then the process returns to block 1302. Otherwise, to start abort, all dirty cache lines in the initiating processor are written-back to primary memory in block 1306. This action may be similar to descriptions above. However, the undo logs must be updated unlike the case for handling a commit request where an update may not be needed. Initiating WT Unit uses the pointer, Head Write Flush in the Transaction ID Directory, to locate the beginning of the Write Flush Directory. The initiating WT Unit will notify the initiating processor to write-back the castout, or the current valid dirty line, to primary memory. Concurrently, initiating WT Unit will replicate the castout and send the castout copy to the network. The network will send the castout copy to other needed WT Units. Also in block 1306, all cache lines that have only been read may be invalidated. Initiating WT Unit uses the pointer, Head Read Flush in the Transaction ID Directory, to locate the beginning of the Read Flush Directory. An entry in this directory has the same structure as Write Flush Directory, but different contents.

In block 1308, the other needed WT Units accept the replicated memory line. The other needed nodes update their respective undo logs, may or may not update their respective collision tags, and write the castout copy to their respective memory. These operations may be performed as earlier described. Note that blocks 1306 and 1308—the process of traversing the Write Flush Directory, writing the original dirty cache line to primary memory, and writing the replica line to replica memories—may be implemented in several ways as described above in the description of the synchronization, or commit, process.

In decision block 1310, the steps in blocks 1306 and 1308 are performed until the final entry of Write Flush Directory is reached and all other needed nodes send an acknowledgment to the initiating node of the completed write-back of this final castout copy. If the final castout has been copied and written-back to all replica memories and the initiating processor is made aware of this fact, then in block 1312, the initiating WT Unit sends notice of a fault occurrence to the replica nodes through a network. Otherwise, the process may return to block 1306 or block 1308 depending on the implementation of the Write Flush Directory traversal and write-back of castouts to the replica memories such as the examples listed above in the description of the synchronization, or commit, process.

In block 1314, in one embodiment, upon receipt of a signal of an abort request from the initiating WT Unit, the other needed WT Units restore the replica memories to the state of both primary memory and replica memories at the pre-transaction state. The initiating and other needed WT Units access their respective Transaction ID Directory to inform the corresponding processors of the location of their respective undo logs. The undo log is traversed by the corresponding processors in the reverse order that the undo logs were filled and the primary and replica memories are modified according to the contents in the undo logs. This step continues until the last entry of the undo log is reached and, thus, the primary and replica memories are restored to the pre-transaction state. Then the undo logs are cleared, which may occur simply by equating the start and end pointers in the Transaction ID Directory. Also, the collision tags are cleared in the Transaction Space Directory. The other needed nodes send a final completion acknowledgment signal to the initiating node through the network.

In block 1316, upon receipt of the final completion acknowledgment signals from all other needed WT Units, the initiating WT Unit notifies the initiating processor of the completion of abort of all necessary nodes.

It is noted that the above-described embodiments may comprise software. In such an embodiment, the program instructions that implement the methods and/or mechanisms may be conveyed or stored on one or more computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a first node comprising a first wiretap circuitry and a first memory, wherein the first memory comprises a primary portion;
   a second node comprising a second memory, wherein the second memory comprises a replica portion configured to persistently maintain an up to date copy of all data stored in said primary portion, wherein the second node is coupled to the first node via an interconnect;
   wherein the first wiretap circuitry is configured to:
      detect all memory accesses which cause changes to data stored in the primary portion; and
      convey identifying data which identifies said changes to the second node;
   wherein the second node, in response to receiving the identifying data, is configured to:
      modify data stored in the replica portion to reflect said changes, thereby maintaining an up to date copy of data stored in the primary portion; and
      update an undo log in the second memory to reflect said modification to the replica portion;
   wherein in response to detecting a transaction commit operation, the first wiretap circuitry is further configured to:
      convey a first indication to a processing unit in the first node which causes the processing unit to evict all modified data within one or more caches within the processing unit, wherein the modified data represents data not stored in the primary portion or the replica portion, wherein in response to the eviction of the modified data, the data stored in the primary portion is updated with the modified data; and
      receive and convey the modified data to the second node, in response to the eviction of the modified data, wherein the replica portion is updated with the modified data; and
   wherein the first indication further causes read only data within the one or more caches to be invalidated, wherein the read only data is a copy of data stored in the primary portion and corresponds to memory accesses which do not cause changes to data stored in the primary portion.

2. The system as recited in claim 1, wherein in response to the replica portion being updated with said evicted modified data, the second node is further configured to:
   convey a second indication to the first wiretap circuitry; and
   clear the undo log.

3. The system as recited in claim 1, wherein said first wiretap circuitry is further configured to replicate and send the evicted modified data to the second node.

4. The system as recited in claim 1, wherein in response to detecting a transaction abort indication, the first wiretap circuitry is further configured to convey a third indication for evicting modified data within one or more caches within the processing unit of the first node, wherein the modified data corresponds to the primary portion.

5. The system as recited in claim 4, wherein in response to the replica portion being updated with said evicted modified data, the second node is further configured to:
   restore the replica portion while utilizing the undo log to a state of the replica portion corresponding to a previous transaction commit indication; and
   clear the undo log.

6. The system as recited in claim 5, wherein responsive to failure of the first node, the second node is configured to continue execution of transactions corresponding to the primary portion which were aborted due to said failure.

7. The system as recited in claim 1, wherein the first node is further configured to convey an interrupt signal, in response to detecting a modifying memory access by a transaction to a location within the primary portion that corresponds to another transaction to the location which is pending.

8. A method comprising:
   detecting all memory accesses which cause changes to data stored in a primary portion of a first memory in a first node;
   conveying identifying data which identifies said changes to a second node, wherein the second node includes a second memory comprising a replica portion configured to persistently maintain an up to date copy of all data stored in said primary portion;
   modifying data stored in the replica portion to reflect said changes, thereby maintaining an up to date copy of data stored in the primary portion, in response to receiving the identifying data at the second node; and
   updating an undo log in the second memory to reflect said modification to the replica portion;
      wherein in response to detecting a transaction commit operation, the method further comprises:
         conveying a first indication to a processing unit in the first node which causes the processing unit to evict all modified data within one or more caches within the processing unit, wherein the modified data represents data not stored in the primary portion or the replica portion, wherein in response to the eviction of the modified data, the data stored in the primary portion is updated with the modified data; and
         receiving and conveying the modified data to the second node, in response to the eviction of the modified data, wherein the replica portion is updated with the modified data; and
   wherein the first indication further causes read only data within the one or more caches to be invalidated, wherein the read only data is a copy of data stored in the primary portion and corresponds to memory accesses which do not cause changes to data stored in the primary portion.

9. The method as recited in claim 8, in response to the replica portion being updated with said evicted modified data, further comprising:
   conveying a second indication to the first node; and
   clearing the undo log.

10. The method as recited in claim 9, wherein said second indication further indicates the replica portion stores an up to date copy of the first portion.

11. The method as recited in claim 8, in response to detecting a transaction abort indication, further comprising conveying a third indication for evicting modified data within one or more caches within the processing unit of the first node, wherein the modified data corresponds to the primary portion.

12. The method as recited in claim 11, in response to the replica portion being updated with said evicted modified data, further comprising:
   restoring the replica portion while utilizing the undo log to a state of the replica portion corresponding to a previous transaction commit indication; and
   clearing the undo log.

13. The method as recited in claim 12, wherein responsive to failure of the first node, further comprising the second node continuing execution of transactions corresponding to the primary portion which were aborted due to said failure.

14. The method as recited in claim 8, further comprising conveying an interrupt signal, in response to detecting a modifying memory access by a transaction to a location within the primary portion that corresponds to another transaction to the location which is pending.

15. An wiretap unit comprising:
   a first interface configured to communicate with one or more processing units in a first processing node that includes a first memory comprising a primary portion; and
   a second interface configured to communicate with a network I/O interface; and control circuitry configured to:
      detect all memory accesses which cause changes to data stored in a primary portion of a first memory in a first node;
      convey via the network I/O interface identifying data which identifies said changes to a second node, wherein the second node includes a second memory comprising a replica portion configured to persistently maintain an up to date copy of all data stored in said primary portion;
      modify data stored in the replica portion to reflect said changes, thereby maintaining an up to date copy of data stored in the primary portion, in response to receiving the identifying data at the second node; and
      update an undo log in the first memory to reflect said modification to the first replica portion;
   wherein in response to detecting a transaction commit operation, the control circuitry is further configured to:
      convey a first indication to a processing unit in the first processing node which causes the processing unit to evict all modified data within one or more caches within the processing unit, wherein the modified data represents data not stored in the primary portion or the replica portion, wherein in response to the eviction of the modified data, the data stored in the primary portion is updated with the modified data; and
      receive and convey the modified data to the second node, in response to the eviction of the modified data, wherein the replica portion is updated with the modified data; and wherein the first indication further causes read only data within the one or more caches to be invalidated, wherein the read only data is a copy of data stored in the primary portion and corresponds to memory accesses which do not cause changes to data stored in the primary portion.

16. The wiretap unit as recited in claim 15, wherein the control circuitry comprises one or more directories, the one or more directories are configured to:

store data identifying said primary portion of memory within the first processing node; and store data identifying processing nodes which are configured to replicate said region of memory.

17. The wiretap unit as recited in claim 16, wherein the wiretap unit is further configured to detect a castout of data which corresponds to the primary portion of memory, and convey corresponding data to said second node.

18. The wiretap unit as recited in claim 17, wherein the wiretap unit is further configured to maintain a log of memory access operations performed within the first processing node.

* * * * *